US009460752B2

(12) United States Patent
Svendsen et al.

(10) Patent No.: US 9,460,752 B2
(45) Date of Patent: Oct. 4, 2016

(54) MULTI-SOURCE JOURNAL CONTENT INTEGRATION SYSTEMS AND METHODS

(75) Inventors: Jostein Svendsen, Saratoga, CA (US); Bjørn Rustberggaard, Nesøya (NO)

(73) Assignee: WeVideo, Inc., Menlo Park, CA (US)

( * ) Notice: Subject to any disclaimer, the term of this patent is extended or adjusted under 35 U.S.C. 154(b) by 0 days.

(21) Appl. No.: 13/434,709

(22) Filed: Mar. 29, 2012

(65) Prior Publication Data

US 2012/0254778 A1    Oct. 4, 2012

Related U.S. Application Data

(60) Provisional application No. 61/468,725, filed on Mar. 29, 2011, provisional application No. 61/564,256, filed on Nov. 28, 2011, provisional application No. 61/564,257, filed on Nov. 28, 2011, provisional application No. 61/564,261, filed on Nov. 28, 2011.

(51) Int. Cl.

| | |
|---|---|
| *G11B 27/031* | (2006.01) |
| *H04N 5/76* | (2006.01) |
| *H04N 21/222* | (2011.01) |
| *H04N 21/233* | (2011.01) |
| *H04N 21/234* | (2011.01) |

(Continued)

(52) U.S. Cl.
CPC ............ *G11B 27/031* (2013.01); *H04N 5/76* (2013.01); *H04N 21/222* (2013.01); *H04N 21/233* (2013.01); *H04N 21/23424* (2013.01); *H04N 21/2541* (2013.01); *H04N 21/25435* (2013.01); *H04N 21/47205* (2013.01)

(58) Field of Classification Search
CPC .......... G06F 8/34; G06F 9/4443; G06F 8/38; G06F 3/0481; G06F 15/16; H04L 29/0809; G11B 27/031

USPC ................. 715/763, 716, 723, 719; 386/52; 709/203
See application file for complete search history.

(56) References Cited

U.S. PATENT DOCUMENTS

| | | |
|---|---|---|
| 4,932,054 A | 6/1990 | Chou et al. |
| 4,977,594 A | 12/1990 | Shear |

(Continued)

OTHER PUBLICATIONS

Apple Inc., "Final Cut Pro 7 User Manual," pp. 1-2, 1553-1583, 1995-2030, (2010).

(Continued)

*Primary Examiner* — Ajay Bhatia
*Assistant Examiner* — Mong-Shune Chung
(74) *Attorney, Agent, or Firm* — Sheppard, Mullin, Richter & Hampton LLP

(57) ABSTRACT

The paper discloses a system including a multi-source content acquisition engine configured to provide an instruction to launch an editor window to display a set of selectable content from user-generated content generated by a plurality of remote sources and stored in a content datastore. The system includes a multi-source content selection configured to identify a set of selected content from the set of selectable content. The system includes an integrated content arrangement engine configured to arrange the set of selected content into a multi-sourced journal content sequence. The system includes a layer integration engine configured to apply a layer from the layer datastore to a portion of the multi-sourced journal content sequence. The system includes a multi-source content launch engine configured to provide an instruction to display an integrated multi-sourced journal content sequence including the multi-sourced journal content sequence and the layer in the editor window.

13 Claims, 12 Drawing Sheets

(51) Int. Cl.
*H04N 21/254* (2011.01)
*H04N 21/2543* (2011.01)
*H04N 21/472* (2011.01)

(56) References Cited

U.S. PATENT DOCUMENTS

| | | |
|---|---|---|
| 5,247,575 A | 9/1993 | Sprague et al. |
| 6,351,765 B1* | 2/2002 | Pietropaolo et al. ......... 709/218 |
| 6,388,668 B1 | 5/2002 | Elliott |
| 6,442,283 B1 | 8/2002 | Tewfik et al. |
| 6,546,188 B1 | 4/2003 | Ishii et al. |
| 7,120,859 B2 | 10/2006 | Wettach |
| 7,375,768 B2 | 5/2008 | Herberger et al. |
| 7,437,673 B2 | 10/2008 | Hyman et al. |
| 7,587,509 B1 | 9/2009 | Edelman et al. |
| 7,594,039 B2 | 9/2009 | Shima |
| 7,617,278 B1 | 11/2009 | Edelman et al. |
| 7,769,819 B2 | 8/2010 | Lerman et al. |
| 7,809,802 B2 | 10/2010 | Lerman et al. |
| 7,840,661 B2 | 11/2010 | Kalaboukis et al. |
| 7,934,011 B2 | 4/2011 | Gavin et al. |
| 7,945,615 B1 | 5/2011 | Shetty et al. |
| 7,945,916 B1 | 5/2011 | Lozben et al. |
| 8,051,287 B2 | 11/2011 | Shetty et al. |
| 8,136,127 B1 | 3/2012 | Lozben et al. |
| 8,156,176 B2 | 4/2012 | Lerman et al. |
| 8,161,159 B1 | 4/2012 | Shetty et al. |
| 8,166,191 B1 | 4/2012 | Swaminathan et al. |
| 8,176,115 B2 | 5/2012 | Eves et al. |
| 8,205,154 B2 | 6/2012 | Doepke et al. |
| 8,209,611 B2 | 6/2012 | Yoshimine |
| 8,209,618 B2 | 6/2012 | Garofalo |
| 8,218,830 B2 | 7/2012 | Gavin et al. |
| 8,225,228 B2 | 7/2012 | Marinkovich et al. |
| 8,245,188 B2 | 8/2012 | Hertenstein |
| 8,265,457 B2 | 9/2012 | Baum et al. |
| 8,270,815 B2 | 9/2012 | Yen et al. |
| 8,286,069 B2 | 10/2012 | Gavin et al. |
| 8,302,008 B2 | 10/2012 | Hertenstein |
| 8,331,735 B2 | 12/2012 | Lee et al. |
| 8,341,525 B1 | 12/2012 | Achour et al. |
| 8,411,758 B2 | 4/2013 | Folgner et al. |
| 8,412,841 B1 | 4/2013 | Swaminathan et al. |
| 8,433,611 B2 | 4/2013 | Lax et al. |
| 8,451,276 B2 | 5/2013 | Jung |
| 8,495,092 B2 | 7/2013 | Piccionelli et al. |
| 8,510,441 B2 | 8/2013 | Ooi et al. |
| 8,532,469 B2 | 9/2013 | Fiumi |
| 8,577,204 B2 | 11/2013 | Lin et al. |
| 8,639,086 B2 | 1/2014 | Chen et al. |
| 8,667,016 B2 | 3/2014 | Sims et al. |
| 8,667,532 B2 | 3/2014 | Heath |
| 8,695,031 B2 | 4/2014 | Kumar et al. |
| 8,719,865 B2 | 5/2014 | Moonka et al. |
| 8,749,618 B2 | 6/2014 | Fiumi |
| 8,788,941 B2 | 7/2014 | Hedges |
| 8,806,346 B2 | 8/2014 | Hedges |
| 8,812,672 B2 | 8/2014 | Ramaley et al. |
| 8,831,999 B2 | 9/2014 | Bolton et al. |
| 8,868,465 B2 | 10/2014 | Folgner et al. |
| 8,910,045 B2 | 12/2014 | Baum |
| 8,935,236 B2 | 1/2015 | Morita et al. |
| 8,935,611 B2 | 1/2015 | Oberbrunner et al. |
| 8,966,402 B2 | 2/2015 | Lu et al. |
| 8,984,406 B2 | 3/2015 | Pueyo et al. |
| 9,009,581 B2 | 4/2015 | Herberger et al. |
| 9,026,446 B2 | 5/2015 | Fiumi |
| 9,032,297 B2 | 5/2015 | Lovejoy et al. |
| 9,032,298 B2 | 5/2015 | Segal et al. |
| 2001/0041050 A1 | 11/2001 | Iwata et al. |
| 2002/0083324 A1 | 6/2002 | Hirai |
| 2002/0116716 A1 | 8/2002 | Sideman |
| 2002/0144130 A1 | 10/2002 | Rosner et al. |
| 2002/0181732 A1 | 12/2002 | Safavi-Naini et al. |
| 2002/0181738 A1 | 12/2002 | Nakamura et al. |
| 2003/0233462 A1 | 12/2003 | Chien |
| 2005/0289068 A1 | 12/2005 | Stefik et al. |
| 2006/0251383 A1 | 11/2006 | Vronay et al. |
| 2006/0259589 A1 | 11/2006 | Lerman et al. |
| 2007/0106419 A1 | 5/2007 | Rachamadugu |
| 2007/0107032 A1 | 5/2007 | Rachamadugu |
| 2007/0162855 A1 | 7/2007 | Hawk et al. |
| 2007/0208442 A1 | 9/2007 | Perrone |
| 2007/0250901 A1 | 10/2007 | McIntire et al. |
| 2007/0277108 A1 | 11/2007 | Orgill et al. |
| 2007/0300158 A1 | 12/2007 | Kasperkiewicz et al. |
| 2008/0065771 A1 | 3/2008 | Marvit et al. |
| 2008/0123976 A1 | 5/2008 | Coombs et al. |
| 2008/0155614 A1 | 6/2008 | Cooper et al. |
| 2008/0165388 A1 | 7/2008 | Serlet |
| 2008/0183608 A1* | 7/2008 | Gavin et al. .................. 705/35 |
| 2008/0183844 A1 | 7/2008 | Gavin et al. |
| 2008/0193100 A1 | 8/2008 | Baum et al. |
| 2008/0301228 A1 | 12/2008 | Flavin |
| 2009/0007267 A1 | 1/2009 | Hoffmann |
| 2009/0094147 A1 | 4/2009 | Fein et al. |
| 2009/0157608 A1 | 6/2009 | Strathearn et al. |
| 2009/0183081 A1 | 7/2009 | Rodriguez et al. |
| 2009/0196570 A1 | 8/2009 | Dudas et al. |
| 2010/0004944 A1 | 1/2010 | Palaniappan |
| 2010/0169127 A1 | 7/2010 | Malackowski et al. |
| 2010/0169779 A1 | 7/2010 | Mason et al. |
| 2010/0192072 A1 | 7/2010 | Spataro et al. |
| 2010/0226525 A1 | 9/2010 | Levy et al. |
| 2010/0257457 A1 | 10/2010 | De Goes |
| 2010/0260468 A1* | 10/2010 | Khatib et al. .................. 386/52 |
| 2010/0285884 A1 | 11/2010 | Gauer et al. |
| 2011/0026899 A1 | 2/2011 | Lussier et al. |
| 2011/0029883 A1 | 2/2011 | Lussier et al. |
| 2011/0167353 A1 | 7/2011 | Grosz et al. |
| 2011/0213655 A1 | 9/2011 | Henkin et al. |
| 2011/0214045 A1 | 9/2011 | Sumler et al. |
| 2011/0246554 A1 | 10/2011 | Bury et al. |
| 2011/0246892 A1 | 10/2011 | Hedges |
| 2011/0282727 A1 | 11/2011 | Phan et al. |
| 2011/0314390 A1 | 12/2011 | Park et al. |
| 2012/0033948 A1 | 2/2012 | Rodriguez et al. |
| 2012/0079606 A1 | 3/2012 | Evans et al. |
| 2012/0130954 A1 | 5/2012 | Hood |
| 2012/0189282 A1 | 7/2012 | Wyatt et al. |
| 2012/0245952 A1 | 9/2012 | Halterman et al. |
| 2012/0251080 A1 | 10/2012 | Svendsen et al. |
| 2012/0284176 A1 | 11/2012 | Svendsen et al. |
| 2012/0314025 A1 | 12/2012 | Fiumi |
| 2013/0007669 A1 | 1/2013 | Lu et al. |
| 2013/0111326 A1 | 5/2013 | Lockhart et al. |
| 2013/0132462 A1 | 5/2013 | Moorer |
| 2013/0275886 A1 | 10/2013 | Haswell et al. |
| 2013/0311556 A1 | 11/2013 | Srivastava et al. |
| 2014/0047413 A1 | 2/2014 | Sheive et al. |
| 2014/0096020 A1 | 4/2014 | Grosz et al. |
| 2014/0121017 A1 | 5/2014 | Mandryk et al. |
| 2014/0143218 A1 | 5/2014 | Sanghavi et al. |
| 2014/0255009 A1 | 9/2014 | Svendsen et al. |
| 2014/0258101 A1 | 9/2014 | Svendsen et al. |

OTHER PUBLICATIONS

Jokela, Tero et al., "Mobile Video Editor: Design and Evaluation," Proceedings of the 12th International Conference on Human-Computer Interaction: Interaction Platforms and Techniques, pp. 344-353 (Jul. 2007).

VideoToolbox.com, "Video Toolbox - advanced online video editor. Convert, crop, merge or record videos with just a few clicks." (2009) [retrieved from the Internet at http://www.videotoolbox.com/ on Apr. 10, 2014].

* cited by examiner

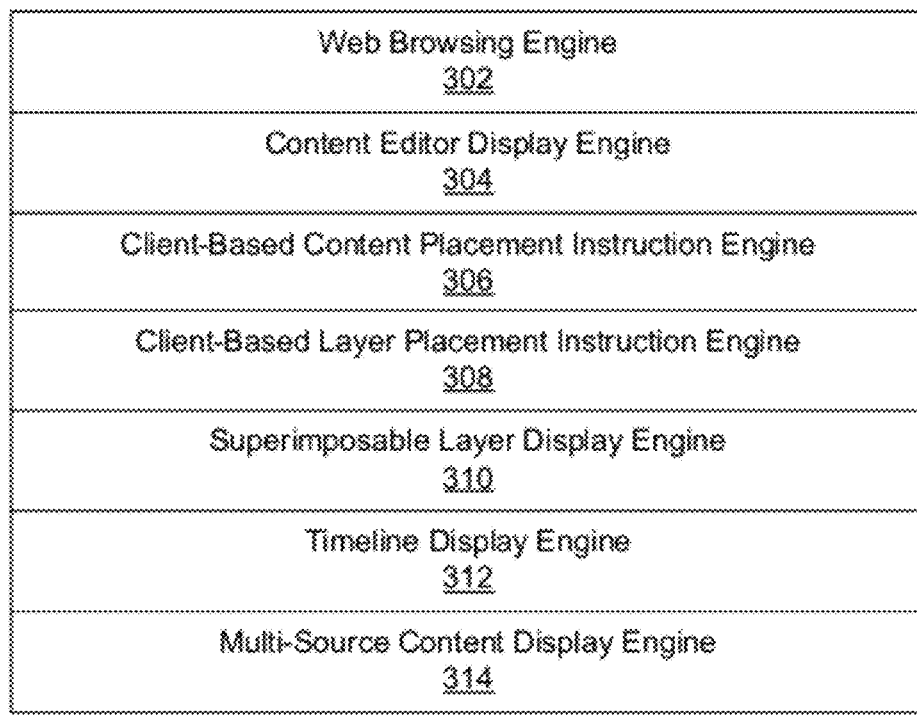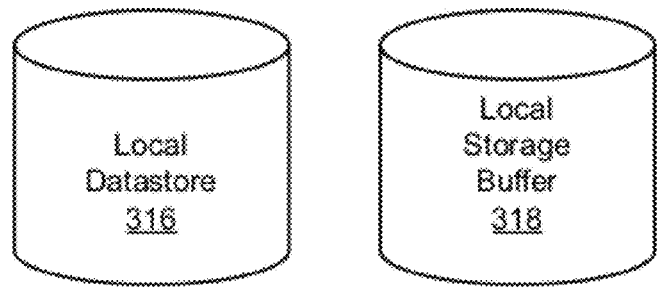
FIG. 3

MULTI-SOURCE JOURNAL CONTENT INTEGRATION SYSTEMS AND METHODS

CROSS-REFERENCE TO RELATED APPLICATIONS

The present application claims benefit of: U.S. Provisional Patent Application Ser. No. 61/468,725 filed Mar. 29, 2011 and entitled "Media Management;" U.S. Provisional Patent Application Ser. No. 61/564,256 filed Nov. 28, 2011 and entitled "Local Timeline Editing for Online Content Editing;" U.S. Provisional Patent Application Ser. No. 61/564,257 filed Nov. 28, 2011 and entitled "Multi-Layer Timeline Content Compilation Systems and Methods;" and U.S. Provisional Patent Application Ser. No. 61/564,261 filed Nov. 28, 2011 and entitled "Systems and Methods for Low Bandwidth Consumption Online Content Editing;" all of which are incorporated herein by reference.

BACKGROUND

Journalists have long captured critical narratives and personal histories that would otherwise be lost in time. Embedded in the modern consciousness are powerful images and videos of warzones, nonviolent and violent protests, and political milestones. "Personal journalists," such as personal photographers and videographers, have similarly captured births, weddings, rites of passage, and the life histories of families and communities.

Journalists conventionally went to the field with expensive and bulky equipment. A journalist would then trek back to an editing studio so that a specialized team of editors could identify publication-worthy material, incorporate special effects and incorporate narrative elements, either using physical editing equipment or locally installed editing systems. Unfortunately, physical editing systems were bulky, were expensive, and required access to film studios. Moreover, locally installed editing systems could not keep pace with the constant flow of information over sources such as the Internet, where images, video, and crucial perspectives of an event can be available in real-time from a plethora of sources. Thus, conventional journalism was unnecessarily slow and expensive. Conventional journalism generated stale messages produced by the centralized information gathering of a few major studios.

The foregoing examples of film editing systems illustrative and are not exclusive. Those of skill in the art can discern other limitations of the art after reading the specification and studying the drawings.

SUMMARY

The present application discloses systems and methods of integrating multi-source journal content compilations. The disclosed systems and methods allow content producers to access high-quality editing tools and to chronicle images, video, and perspectives of an event in real-time from a plethora of sources, without entering film studios and without installing production tools on a local computer. The disclosed systems and methods are portable, avoid specialized or high-performance computers, keep pace with the constant flow of information over sources such as the Internet, and ultimately, democratize journalism.

Systems can include a content datastore, a layer datastore, a multi-source content acquisition engine coupled to the content datastore; a multi-source content selection engine coupled to the multi-source content acquisition engine; an integrated content arrangement engine coupled to the multi-source content selection engine; a layer integration engine coupled to the layer datastore and to the integrated content arrangement engine; and a multi-source content launch engine coupled to the layer integration engine.

In operation, the multi-source content acquisition engine provides an instruction to launch an editor window to display a set of selectable content from user-generated content generated by a plurality of remote sources and stored in the content datastore. In operation, the multi-source content selection engine identifies a set of selected content from the set of selectable content.

In operation, the integrated content arrangement engine arranges the set of selected content into a multi-sourced journal content sequence. In operation, the layer integration engine applies a layer from the layer datastore to a portion of the multi-sourced journal content sequence. In operation, the multi-source content launch engine provides an instruction to display an integrated multi-sourced journal content sequence including the multi-sourced journal content sequence and the layer in the editor window.

Systems can include a multi-source channel publication engine coupled to the layer integration engine. In operation, the multi-source channel publication engine creates a multi-source content channel comprising the integrated multi-sourced journal content sequence.

Systems can include a multi-source content search engine coupled to the content datastore and the multi-source content acquisition engine. In operation, the multi-source content search engine receives a request from the multi-source content acquisition engine to search the content datastore for subject-specific content, and provides the subject-specific content to the multi-source content acquisition engine.

Systems can include a collaborative edit aggregation engine coupled to the layer datastore and the layer integration engine. In operation, the collaborative edit aggregation engine provides to the layer integration engine a plurality of instructions comprising: a first instruction from a first remote source to apply a first layer from the layer datastore to the portion of the multi-sourced journal content sequence, and a second instruction from a second remote source to apply a second layer from the layer datastore to the portion of the multi-sourced journal content sequence.

Systems can include a collaborative edit launch engine coupled to the multi-source content acquisition engine. In operation, the collaborative edit launch engine: receives the instruction to launch the editor window from the multi-source content acquisition engine, and launches a first editor window on a first edit client and a second editor window on a second edit client based on the instruction to launch the editor window.

Systems can include a collaborative layer placement engine coupled to the layer integration engine. In operation, the collaborative layer placement engine provides to the layer integration engine a first layer received from a first editor window and a second layer received from a second editor window.

Systems can include a journalism sourcing engine coupled to the content datastore. In operation, the journalism sourcing engine provides to the content datastore: first user-generated coverage of an event obtained from a first citizen journalist, and second user-generated coverage of the event obtained from a second citizen journalist.

Systems can include a content scrapbooking engine coupled to the content datastore. In operation, the content scrapbooking engine can provide to the content datastore user-generated social history content.

Methods can include: using a multi-source content acquisition engine to provide an instruction to launch an editor window to display a set of selectable content from user-generated content generated by a plurality of remote sources and stored in a content datastore; configuring a multi-source content selection engine to identify a set of selected content from the set of selectable content; using an integrated content arrangement engine to arrange the set of selected content into a multi-sourced journal content sequence; using a layer integration engine to apply a layer from the layer datastore to a portion of the multi-sourced journal content sequence; and providing an instruction to display, using a multi-source content launch engine, an integrated multi-sourced journal content sequence including the multi-sourced journal content sequence and the layer in the editor window.

Methods can include using a multi-source channel publication engine to create a multi-sourced content channel comprising the integrated multi-sourced journal content sequence.

Methods can include using a multi-source content search engine to receive a request from the multi-source content selection engine to search the content datastore for subject-specific content. Methods can also include using the multi-source content search engine to provide the subject-specific content to the multi-source content selection engine.

Methods can include using a collaborate edit aggregation engine to provide to the layer integration engine a plurality of instructions comprising: a first instruction from a first remote source to apply a first layer from the layer datastore to the portion of the multi-sourced journal content sequence, and a second instruction from a second remote source to apply a second layer from the layer datastore to the portion of the multi-sourced journal content sequence.

Methods can include using a collaborative edit launch engine to: receive the instruction to launch the editor window from the multi-source content acquisition engine, and to launch a first editor window on a first edit client and a second editor window on a second edit client based on the instruction to launch the editor window.

Methods can include using a collaborative layer placement engine to provide to the layer integration engine a first layer received from a first editor window and a second layer received from a second editor window.

Methods can include using a journalism sourcing engine to provide to the content datastore: first user-generated coverage of an event obtained from a first citizen journalist, and second user-generated coverage of the event obtained from a second citizen journalist.

Method can include using a content scrapbooking engine to provide to the content datastore user-generated social history content.

Systems can include: means for using a multi-source content acquisition engine to provide an instruction to launch an editor window to display a set of selectable content from user-generated content generated by a plurality of remote sources and stored in a content datastore; means for configuring a multi-source content selection engine to identify a set of selected content from the set of selectable content; means for using an integrated content arrangement engine to arrange the set of selected content into a multi-sourced journal content sequence; means for using a layer integration engine to apply a layer from the layer datastore to a portion of the multi-sourced journal content sequence; and means for providing an instruction to display, using a multi-source content launch engine, an integrated multi-sourced journal content sequence including the multi-sourced journal content sequence and the layer in the editor window.

BRIEF DESCRIPTION OF THE DRAWINGS

FIG. 3 shows a diagram of an example of a multi-source journal content integration client.

DETAILED DESCRIPTION

This paper describes techniques that those of skill in the art can implement in numerous ways. For instance, those of skill in the art can implement the techniques described herein using a process, an apparatus, a system, a composition of matter, a computer program product embodied on a computer readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used herein, the term 'processor' refers to one or more devices, circuits, and/or processing cores configured to process data, such as computer program instructions.

Figure 1:
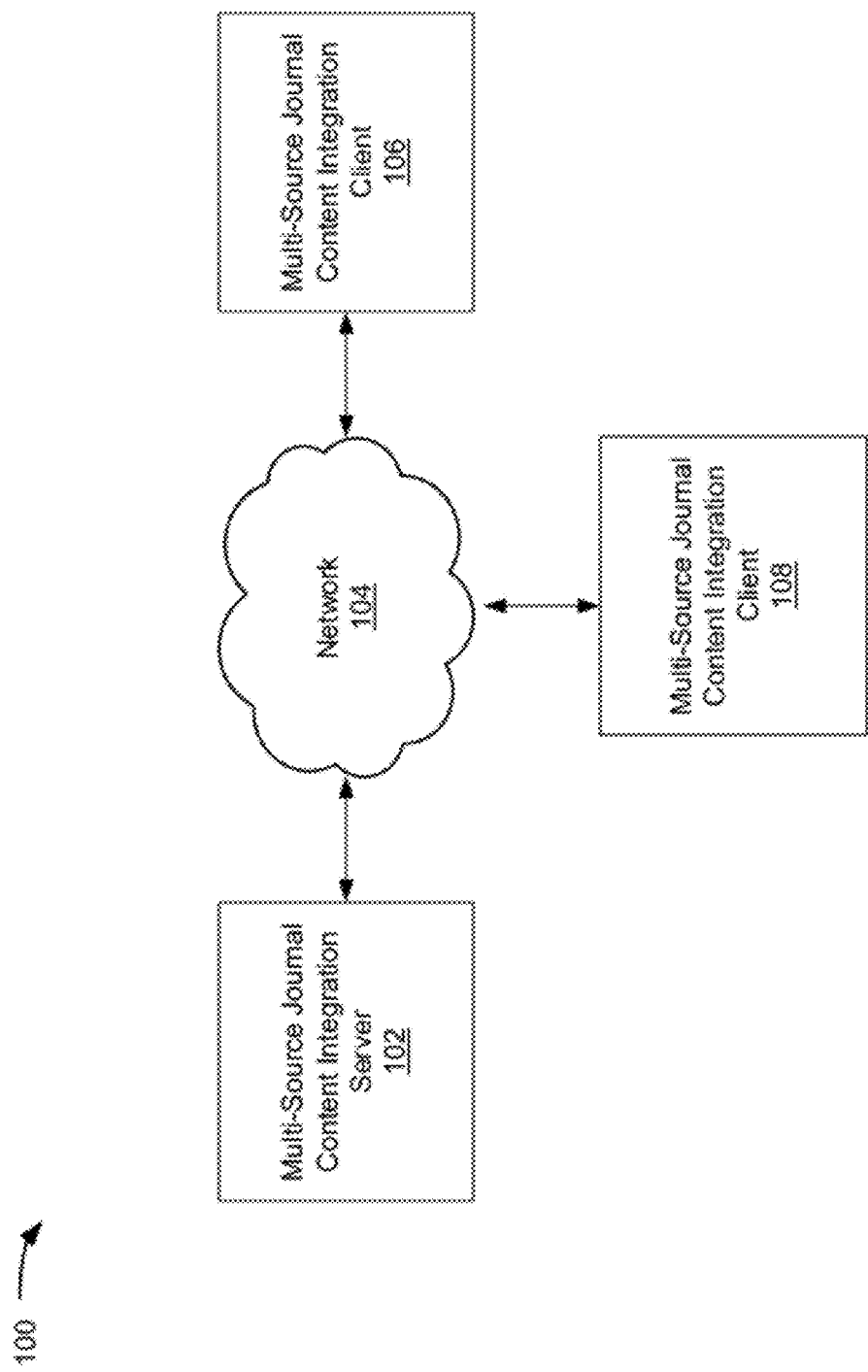
FIG. 1 shows a diagram of an example of a network environment.

FIG. 1 shows a diagram of an example of a network environment 100. In the example of FIG. 1, the network environment 100 can include a multi-source journal content integration server 102, a network 104, a multi-source journal content integration client 106, and a multi-source journal content integration client 108. In the example of FIG. 1, the network 104 connects to each of the multi-source journal content integration server 102, the multi-source journal content integration client 106, and the multi-source journal content integration client 108.

In the example of FIG. 1, the multi-source journal content integration server 102 can provide services to integrate multi-sourced content, such as journal content. As used in this paper, multi-sourced content is audio, video, still pictures, or other content generated by a plurality of content generators. A content generator is typically an individual, but can also be a group, a business entity, or other entity, that creates content using a device like a camera, a video camera, an electronic device (such as a mobile phone or other electronic device), or other device. In some embodiments, the content generator's device can comprise an electronic scanner used to capture a painting or drawing. The content generator's device can also include an electronic device that captures content using an input device (e.g., a computer that captures a user's gestures with a mouse or touch screen). In various embodiments, the content generator can be the entity having creative rights (e.g., an assignee or a licensee) of content. As a plurality of content generators are creating the content integrated by the multi-source journal content integration server 102, the clips being integrated are likely to reflect a variety of perspectives about a given event, place, or occurrence, whether or not the respective content generators share a unified ideology or mission.

As used in this paper, journal content is content related to the investigation or reporting of places, events, occurrences, and other things. Journal content can include, for instance, still images, audio, video, media, and other content related to covering government, business, societal occurrences, cultural events, arts, entertainment, and other topics. Journal content can involve reporting on a variety of levels.

In the example of FIG. 1, the journal content can include translating the actions of policy makers or decision-makers into a format that laypeople and/or the general public can comprehend. More specifically, the journal content can involve chronicling the decisionmaking process underlying an event (such as a Congressional vote on a topic, a nearby protest or rally, or even a dogshow) and translating the decisionmaking process into a format that laypeople can understand. Distilling the decisionmaking process of an event can involve capturing important elements of the event to construct a narrative of the processes that went into creating the event. In some embodiments, the journal content can also include creating a forum to facilitate debate, deliberation, and decision on issues of public or private concern. For example, the journal content can include facilitating a multitude of inputs on a given topic and allowing content generators or others to have a degree of editorial control over a subsequent narrative of the topic. Thus, in some embodiments, the journal content can allow content generators or content generators to wholly or partially create a portion of the narrative of the topic. In various embodiments, the journal content can include a report of an event that occurred or is occurring. For example, the journal content can include raw footage in the form of still images, audio, video, or media about an event such as an important political vote, a business's decision, or a protest.

In the example of FIG. 1, the multi-sourced journal content can reflect a variety of observations and perspectives about an event and need not be confined to one editorial or creative vision. For example, multi-sourced journal content of a protest can include raw footage of protest participants who have released a first-person perspective of the protest. However, multi-sourced journal content of the protest need not be confined to a protestor's vision of the event. Rather, the multi-sourced journal content of the protest can include: raw footage from opponents of the protest, footage from police cameras used to capture illegal acts by those nearby, footage from third-party observers (like nearby residents) who are neutral to the protest's message, and professional footage from photojournalists, videographers, and others who wish to sell content to editors. As this example illustrates, the multi-sourced journal content can accommodate a variety of visions about an event. Footage from protestors and protest opponents may be focused on the merits of the message of the protest, while footage from law enforcement may be focused on whether participants were behaving illegally or inappropriately. Footage from third parties may be focused on capturing the effects of the protest on the neighborhood, while footage from professionals may be focused on capturing highly composed attributes of the protest.

In the example of FIG. 1, the multi-source journal content integration server 102 can incorporate a collaborative marketplace to facilitate exchange of specific content clips of the multi-sourced journal content. The collaborative marketplace may or may not be based on a royalty-based system of exchange. In a royalty-based system of exchange, a content generator can receive a royalty for granting permission to use an item of content. In this example, the specific content clips of the multi-sourced journal content can include rights management features, as discussed more thoroughly below. The collaborative marketplace can therefore create incentives for content generators to share and monetize generated content without completely and irreversibly releasing the content into the public domain.

In the example of FIG. 1, the multi-source journal content integration server 102 can include one or more engines. As used in this paper, an "engine" includes a dedicated or shared processor and, typically, firmware or software modules that are executed by the processor. Depending upon implementation-specific or other considerations, an engine can be centralized or its functionality distributed. An engine includes special purpose hardware, firmware, or software embodied in a computer-readable medium for execution by the processor. As used in this paper, a computer-readable medium is intended to include all mediums that are statutory (e.g., in the United States, under 35 U.S.C. §101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the multi-source journal content integration server 102 can include an operating system. An operating system is a set of programs that manage computer hardware resources, and provides common services for application software. The operating system enables an application to run on a computer, whereas only applications that are self-booting can generally run on a computer that does not have an operating system. Operating systems are found in almost any device that includes a computer (e.g., cellular phones, video game consoles, web servers, etc.). Examples of popular modern operating systems are Linux, Android, iOS, Mac OS X, and Microsoft Windows®. Embedded operating systems are designed to operate on small machines like PDAs with less autonomy (Windows CE and Minix 3 are some examples of embedded operating systems). Operating systems can be distributed, which makes a group of independent computers act in some respects like a single computer. Operating systems often include a kernel, which controls low-level processes that most users cannot see (e.g., how memory is read and written, the order in which processes are executed, how information is received and sent by I/O devices, and devices how to interpret information received from networks). Operating systems often include a user interface that interacts with a user directly to enable control and use of programs. The user interface can be graphical with icons and a desktop or textual with a command line. Application programming interfaces (APIs) provide services and code libraries. Which features are considered part of the operating system is defined differently in various operating systems, but all of the components are treated as part of the operating system in this paper for illustrative convenience.

In the example of FIG. 1, the multi-source journal content integration server 102 can include one or more datastores that hold content, editing layers, and/or other data. A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In the example of FIG. 1, the multi-source journal content integration server 102 can be compatible with a cloud based computing system. As used in this paper, a cloud based computing system is a system that provides computing resources, software, and/or information to client devices by maintaining centralized services and resources that the client devices can access over a communication interface, such as a network. The cloud based computing system can involve a subscription for services or use a utility pricing model. Users can access the protocols of the cloud based computing system through a web browser or other container application located on their client device.

In the example of FIG. 1, one or more of the engines in the multi-source journal content integration server 102 can include cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices. In the example of FIG. 1, one or more of the datastores in the multi-source journal content integration server 102 can be cloud-based datastores. A cloud-based datastore is a datastore compatible with a cloud-based computing system.

For instance, the multi-source journal content integration server 102 can host a website providing multi-sourced journal content integration and/or editing services. The website can access engines and datastores that provide a user with tools to edit the content online. The engines in the multi-source journal content integration server 102 can execute on the multi-source journal content integration server 102 and can provide a cloud-based interface for display on a host application, such as a web browser on one or more of the multi-sourced journal content integration client 106 and the multi-sourced journal content integration client 108.

In various embodiments, the datastores in the multi-source journal content integration server 102 can include datastores, distributed across multiple computing devices or otherwise, that provide content, editing layers, and/or other data that applications and/or end users can access through a web browser or container application without having the functionalities and/or modules installed locally on the end-users' computing devices.

In some embodiments, an end-user need not purchase a proprietary operating system or install expensive journal content integration and/or editing software, as long as the user has access to a web browser or container application that can access the engines and datastores in the multi-source journal content integration server 102.

A user also need not purchase expensive and high-performance computing equipment or memory. Beneficially, a user need not purchase extensive content editing packages, such as high-quality editing-effects packages as editing-effects packages would be stored and executed in the multi-source journal content integration server 102. Users need not worry about software becoming obsolete because a remote online application can be used to run any executable file, regardless of whether the file is currently executable on the user's device; legacy platforms can run on any device. Accordingly, one or more of the engines in the multi-source journal content integration server 102 can support applications and/or functionalities that end-users can access through a container (such as a web browser) without local installation.

In the example of FIG. 1, the network 104 can include a computer network. The network 104 can include communication channels to connect server resources and information in the multi-source journal content integration server 102 with client resources and information in the multi-source journal content integration clients 106 and 108. In the example of FIG. 1, the network 104 can be implemented as a personal area network (PAN), a local area network (LAN), a home network, a storage area network (SAN), a metropolitan area network (MAN), an enterprise network such as an enterprise private network, a virtual network such as a virtual private network (VPN), or other network. One network of particular interest for an online application service is the World Wide Web ("the Web"), which is one of the services running on the Internet. The Web is a system of interlinked hypertext documents accessed via the Internet. With a web browser, one can view web pages that can contain text, images, videos, and other multimedia and navigate between the web pages via hyperlinks. The network 104 can serve to connect people located around a common area, such as a school, workplace, or neighborhood. The network 104 can also connect people belonging to a common organization, such as a workplace. Portions of the network 104 can be secure and other portions of the network 104 need not be secure.

In the example of FIG. 1, the network 104 can use a variety of physical or other media to connect the multi-source journal content integration server 102 with the multi-source journal content integration clients 106 and 108. For instance, the network 104 can connect the multi-source journal content integration server 102 with one or more of the multi-source journal content integration clients 106 and 108 using some combination of wired technologies, such as twisted pair wire cabling, coaxial cabling, optical fiber cabling, or other cabling.

In the example of FIG. 1, the network 104 can also use some combination of wireless technologies. Wireless networks will typically include an internetworking unit (IWU) that interconnects wireless devices on the relevant one of the wireless networks with another network, such as a wired LAN. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station. Wireless networks can be implemented using any applicable technology, which can differ by network type or in other ways. The wireless networks can be of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. The wireless networks 2404 can be identifiable by network type (e.g., 2G, 3G, Wi-Fi), service provider, WAP/base station identifier (e.g., Wi-Fi SSID, base station and sector ID), geographic location, or other identification criteria. The wireless networks may or may not be coupled together via an intermediate network. The intermediate network can include practically any type of communications network, such as, by way of example but not limitation, the Internet, a public switched telephone network (PSTN), or an infrastructure network (e.g., private LAN). The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 1, one or more of the multi-source journal content integration clients 106 and 108 can include one or more computers, each of which can, in general, have an operating system and include datastores and engines. In this example, one or more of the multi-source journal content integration clients 106 and 108 can execute variable-layer content editing services inside a host application (i.e., can execute a browser plug-in in a web browser). The browser plug-in can provide an interface such as a graphical user interface (GUI) for a user to access the content editing services on the multi-source journal content integration server 102. The browser plug-in can include a GUI to display content and layers on the datastores in the multi-source journal content integration server 102. For instance, the browser plug-in can have display capabilities like the capabilities provided by proprietary commercially available plug-ins like Adobe® Flash Player, QuickTime®, and Microsoft Silverlight®. The browser plug-in can also include an interface to execute functionalities on the engines in the multi-source journal content integration server 102.

In the example of FIG. 1, a device on which the multi-source journal content integration clients 106 and 108 is implemented can be implemented as a station. A station, as used herein, may be referred to as a device with a media access control (MAC) address and a physical layer (PHY) interface to the wireless medium that comply with, e.g., the IEEE 802.11 standard. A station can be described as "IEEE 802.11-compliant" when compliance with the IEEE 802.11 standard is intended to be explicit. (I.e., a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made. IEEE Std 802.11™-2007 (Revision of IEEE Std 802.11-1999) is incorporated by reference. IEEE 802.11k-2008, IEEE 802.11n-2009, IEEE 802.11p-2010, IEEE 802.11r-2008, IEEE 802.11w-2009, and IEEE 802.11y-2008 are also incorporated by reference.

In alternative embodiments, one or more wireless devices may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

Figure 2:
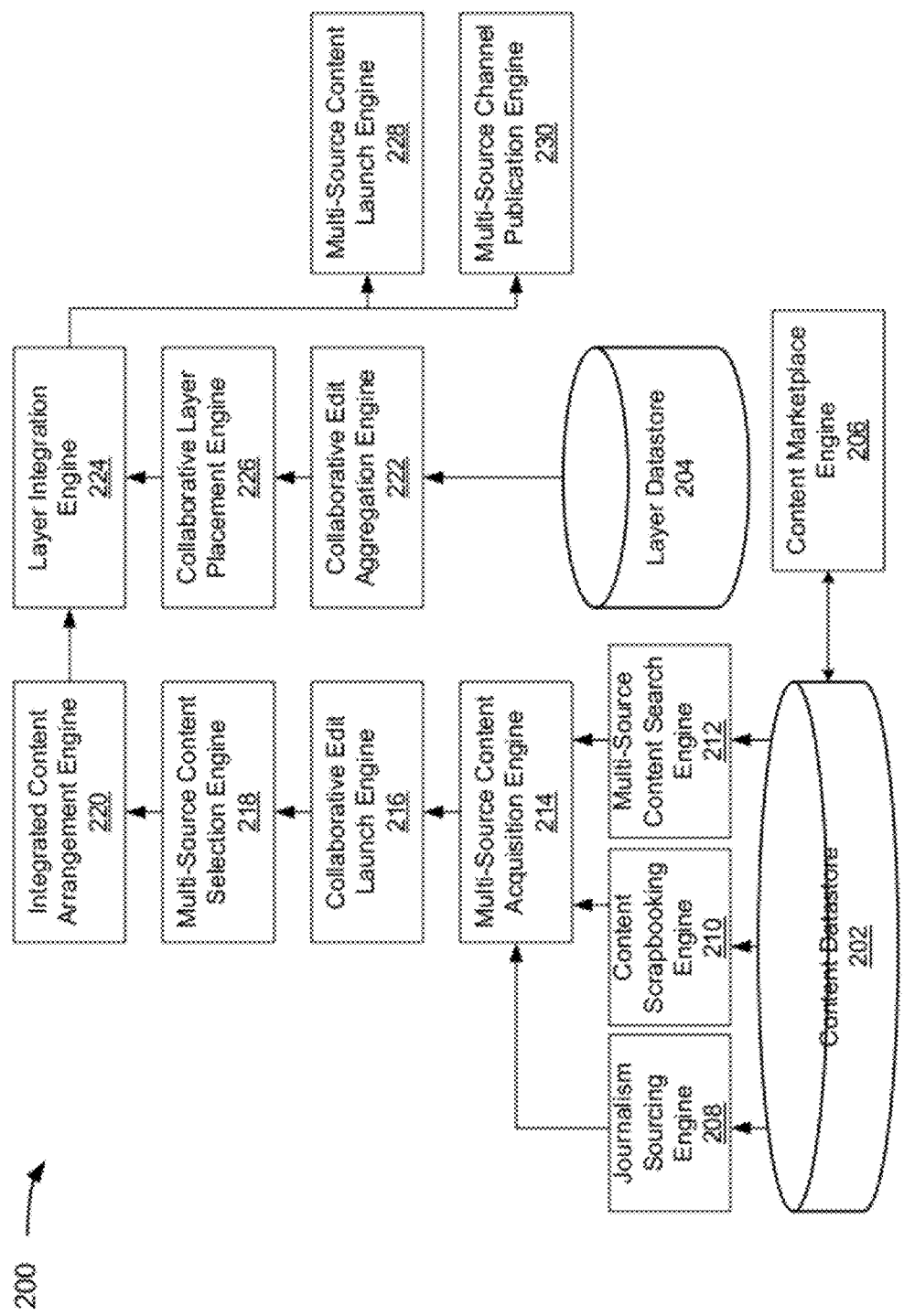
FIG. 2 shows a diagram of an example of a multi-source journal content integration server.

FIG. 2 shows an example of a multi-source journal content integration server 200. In the example of FIG. 2, the multi-source journal content integration server 200 can include one or more of: a content datastore 202, a layer datastore 204, a content marketplace engine 206, a journalism sourcing engine 208, a content scrapbooking engine 210, a multi-source content search engine 212, a multi-source content acquisition engine 214, a collaborative edit launch engine 216, a multi-source content selection engine 218, an integrated content arrangement engine 220, a collaborative edit aggregation engine 224, a layer integration engine 222, a collaborative layer placement engine 226, a multi-source content launch engine 228, and a multi-source channel publication engine 230.

In the example of FIG. 2, the content marketplace engine 206, the journalism sourcing engine 208, the content scrapbooking engine 210, and the multi-source content search engine 212 can each connect to the content datastore 202. The multi-source content acquisition engine 214 can connect to each of the journalism sourcing engine 208, the content scrapbooking engine 210, and the multi-source content search engine 212. The collaborative edit launch engine 216 can connect to the multi-source content acquisition engine 214. The multi-source content selection engine 218 can connect to the collaborative edit launch engine 216. The integrated content arrangement engine 220 can connect to the multi-source content selection engine 218. In the example of FIG. 2, the layer datastore 204 can connect to the collaborative edit aggregation engine 224. The layer integration engine 224 can connect to each of the integrated content arrangement engine 220 and the collaborative layer placement engine 226. The collaborative layer placement engine 226 can connect to the collaborative edit aggregation engine 224. Further, in the example of FIG. 2, each of the multi-source content launch engine 228, and the multi-source channel publication engine 230 can connect to the layer integration engine 222.

In the example of FIG. 2, the content datastore 202 stores content such as audio, still images, video, media, or other content. In some embodiments, the content in the content datastore 202 can be stored in the form of "clips," each comprising a discrete file associated with a specific scene, sound, or image that was captured. One or more of the clips can relate to the same scene, but in various embodiments, the clips can relate to different scenes or different perspectives of one or more scenes. In this example, the content datastore 202 resides within the multi-source content journal integration server 200. However, in some embodiments, the content datastore 202 need not be within the multi-source content journal integration server 200 and may connect to the multi-source content journal integration server 200 by a communication interface such as a network connection. In various embodiments, the content datastore 202 can also be distributed across multiple devices. In some embodiments, the content datastore 202 can reside in cloud-based storage. Advantageously, distributing the content datastore 202 across multiple devices can accommodate a large amount of storage and give the multi-source content journal integration server 200 access to a wide variety of content from a multitude of sources.

In the example of FIG. 2, the content in the content datastore 202 can be "user-generated." As used in this paper "user generated" content refers to content generated by users of an account associated with a service used to manage the content datastore 202. The content can also be generated by a plurality of sources. For instance, the content in the content datastore 202 can be generated by a plurality of computers, mobile phones, cameras, camcorders, scanners, and digital devices.

In the example of FIG. 2, the layer datastore 204 stores editing layers. As used in this paper, an "editing layer" is an element of content that can be superimposed onto another item of content. An editing layer can include one or more of an image, an item of audio, an effect, an item of video, animation, or an interactivity item that can accept user input. In this example, the layer datastore 204 resides within the multi-source content journal integration server 200. However, in some embodiments, the layer datastore 204 need not be within the multi-source content journal integration server 200 and may connect to the multi-source content journal integration server 200 by a communication interface such as a network connection. In various embodiments, the layer datastore 204 can also be distributed across multiple devices. In some embodiments, the layer datastore 204 can reside in cloud-based storage. Advantageously, distributing the layer datastore 204 across multiple devices can provide a user with a nearly unlimited number of editing layers to apply to content. Further, distributing the layer datastore 204 across multiple devices can also provide a user with proprietary or user-generated editing layers that would otherwise be unavailable with a locally installed standalone editing package.

In the example of FIG. 2, the content marketplace engine 206, in operation, can facilitate user-based exchange of user-generated journal content. In this example, the content marketplace engine 206 can index specific items of content in the content datastore 202 by owner. As used herein, an "owner" of content can be a person or entity that owns the rights to reproduce and/or publish the content. In some embodiments, the owner of items of content in the content datastore 202 can be the generator of the items of content. The owner of the items of content in the datastore 202 can also be an assignee, an exclusive or a non-exclusive licensee, or other entity with rights to the items of content. Consistent with this example, the content marketplace engine 206 can associate a price the items of content in the content datastore 202; the price may or may not be set by the owner of the items of content. In some embodiments, the content marketplace engine 206 can establish an offer process, which allows an entity wishing to use an item of content an opportunity to offer a price for the item of content. The price can comprise a monetary value but can also comprise, in various embodiments, an offer to license an item of content owned by the offeree. In this example, the content marketplace engine 206 can also include an acceptance process to allow the owner of the items of content to accept the offer to use for the item of content. Further, in this example, if the offer is accepted, the content marketplace engine 206 can facilitate the transfer of the item of content to the offeree for the offeree's use. In various embodiments, the content marketplace engine 206 can implement rights management processes so that the offeree does not use the items of content beyond the scope of what the owner of the item of content desires.

In the example of FIG. 2, the journalism sourcing engine 208, in operation, can provide to the multi-source content acquisition engine 214 user-generated coverage of an event obtained from one or more citizen journalists. As used in this paper, a "citizen journalist" is an entity that seeks to capture an aspect of the investigation or reporting of a place, an event, an occurrence, or thing. In a sense, a citizen journalist is a generator of journal content and can be armed with, for instance, a camera, a microphone, a video camera, or other device to capture an attribute of journalistic investigation or reporting. In this example, the journalism sourcing engine 208 can receive search parameters focused on the subject matter of journalism. For instance, the journalism sourcing engine 208 can receive keywords about "war," "protests," "Congressional action," "federal agency decisions," "court opinions," "local politics," "news," or can simply receive a zip code or location identifier to use to mine the content datastore 202 for journalism related content. The journalism sourcing engine 208 can also keep an account of the generator of specific clips to ensure that the journalism sourcing engine 208 can obtain content from different content generators.

In the example of FIG. 2, the journalism sourcing engine 208 can provide to the multi-source content acquisition engine 214 a plurality of content clips relating to a single event. For instance, the journalism sourcing engine 208 can provide to the multi-source content acquisition engine 214 multiple images, multiple audio recordings, multiple video or media clips, or some combination thereof, relating to an event such as a protest. In various embodiments, distinct items of content are generated by distinct citizen journalists. Thus, the journalism sourcing engine 208 can provide to the multi-source content acquisition engine 214 first user-generated content of an event obtained from a first citizen journalist as well as second user-generated coverage of the event obtained from a second citizen journalist. Accordingly, the journalism sourcing engine 208 can provide the multi-source content acquisition engine 214 with multiple perspectives of a single event and can accommodate the journalistic capture of the event by amateurs having various perspectives of the event.

In the example of FIG. 2, the content scrapbooking engine 210, in operation, can provide to the multi-source content acquisition engine 214 user-generated social history content. As used in this paper, "social history" content is content associated with a person's familial or community history, lineage, or tradition in a region or during a period of time. In this example, the content scrapbooking engine 210 can receive search parameters focused on the subject matter of social history. For instance, the content scrapbooking engine 210 can receive keywords about "community," "tradition," "births," "obituaries," "rites of passage," "religion," and other keywords. The content scrapbooking engine 210 can also keep an account of the generator of specific clips to ensure that the content scrapbooking engine 210 can obtain content from different content generators.

In the example of FIG. 2, the content scrapbooking engine 210 can provide to the multi-source content acquisition engine 214 a plurality of content clips relating to a single event. For instance, the content scrapbooking engine 210 can provide to the multi-source content acquisition engine 214 multiple images, multiple audio recordings, multiple video or media clips, or some combination thereof, relating to an event such as a Bar Mitzvah. In various embodiments, distinct items of content are generated by distinct content generators. Accordingly, the content scrapbooking engine 210 can provide the multi-source content acquisition engine 214 with multiple perspectives of a single event and can accommodate the capture of the event by amateurs having various perspectives of the event.

In the example of FIG. 2, the multi-source content search engine 212, in operation, executes search queries and retrieves journal content from the content datastore 202. In some embodiments, the multi-source content search engine 212 receives the search queries from the multi-source content acquisition engine 214 or other parts of the system. The multi-source content search engine 212 can base the search queries on one or more search classes. In some embodiments, the search classes can include searches for the subject of journal content or the subject class of journal content. For instance, the multi-source content search engine 212 can query the content datastore 202 for journal content relating to a final decision of a government agency, a local bake sale underway, an event occurring at a financial exchange or a business, or a local auction.

In the example of FIG. 2, the search classes can include searches for specific parameters of a scene that is requested. For instance, the multi-source content search engine 212 can query the content datastore 202 for journal content captured at a particular time of day or having specific color parameters (e.g., blue and yellow hues). In some embodiments, the multi-source content search engine 212 can query the content datastore 202 for scenes shot from a particular vantage point, such as a birds'-eye view.

In the example of FIG. 2, the search classes can include searches for specific content generators or specific groups or classes of content generators. For instance, the multi-source content search engine 212 can query the content datastore 202 for journal content captured by content generators having particular demographic characteristics (e.g., between the ages of 18-25 and male), content generators having particular associations (e.g., who are part of specific friend networks or geographically distributed networks), content generators who share particular general political views (e.g., liberal views) or particular political views on a specific topic (e.g., are against abortion), and content generators of particular socio-economic statuses. The multi-source content search engine 212 can also query the content datastore 202 for combinations of groups or classes of content generators.

In this example, the search classes can include searches for specific journal content parameters. For instance, the multi-source content search engine 212 can limit search queries to images, to audio clips, to video clips, and to other forms of media. The multi-source content search engine 212 can also limit search queries to files of specific length or size. Based on the executed search queries to the content datastore 202, the multi-source content search engine 212 can provide relevant content to the multi-source content acquisition engine 214.

In the example of FIG. 2, the multi-source content acquisition engine 214, in operation, provides a request to the multi-source content search engine 212 search the content datastore 202 for subject-specific content. In some embodiments, the multi-source content acquisition engine 214 can provide a character string corresponding to one or more of search classes, specific scene parameters, specific content generators, specific journal content parameters, and other search parameters. The multi-source content acquisition engine 214 can, based on the executed search, receive a set of relevant content from the multi-source content search engine 212. In various embodiments, the multi-source content acquisition engine 214 can also execute search queries using one or more of the journalism sourcing engine 208 and/or the content scrapbooking engine 210.

In the example of FIG. 2, the multi-source content acquisition engine 214, in operation, provides an instruction to launch an editor window to display a set of selectable content from user-generated content generated by a plurality of sources and stored in the content datastore 202. In the example of FIG. 2, the instruction from the multi-source content acquisition engine 214 can identify a particular client device that launches the editor window. In some embodiments, the instruction can contain a network address such as an Internet Protocol (IP) or other address of the client. The instruction can also contain a device identifier such a Media Access Card (MAC) address of the client. Using the request, the multi-source content acquisition engine 214 can identify a client using destination/network identifiers to launch an editor window on the client.

In the example of FIG. 2, the instruction from the multi-source content acquisition engine 214 can also identify parameters of a client host application. The instruction can identify the operating system on the client and can help the multi-source content acquisition engine 214 determine whether to support the client operating system. The request can also identify the type and version of a host application, such as a web browser, on the client. The request can further identify the screen resolution, processor speed, memory, and network speed of the client device. Using these and other exemplary parameters, the multi-source content acquisition engine 214 can determine whether to support the client's specific host application. The multi-source content acquisition engine 214 can also use the request to supply an edit window with default parameters based on any of the OS or the host application parameters in the request. The multi-source content acquisition engine 214 can further determine whether to recommend an upgraded operating system or host application to the client.

In the example of FIG. 2, the instruction from the multi-source content acquisition engine 214 help perform a "smart-bandwidth" determination. Using the client network speed, the multi-source content acquisition engine 214 can calculate an optimal resolution of the content to provide for editing. For instance, if the request identifies a client connected to a Digital Signal 3 (T3) connection or other relatively fast Internet connection, the multi-source content acquisition engine 214 can determine it is desirable to provide relatively high quality media content (e.g., high definition (HD) media content) for editing. On the other hand, if the request identifies a client being connected to a dial-up modem, the multi-source content acquisition engine 214 can determine it is desirable to provide relatively low quality media content for editing.

In the example of FIG. 2, the instruction from the multi-source content acquisition engine 214 can include user account parameters. Further, in some embodiments, the multi-source content acquisition engine 214 can direct the edit window to the device identified for display. The multi-source content acquisition engine 214 can characterize the edit window with a resolution and other parameters that are supported by the client device's operating system and host application. For instance, the multi-source content acquisition engine 214 can access application programming interfaces or other modules on the client to load an edit window as a browser plug-in in a web browser running on the client. The multi-source content acquisition engine 214 can also use the "smart-bandwidth" determination to limit the maximum resolution of the edit window. As a result, the multi-source content acquisition engine 214 can launch a highly usable, easily portable content edit window while installing no new applications on the client.

In the example of FIG. 2, the multi-source content acquisition engine 214 can instruct the launched editor window to display a set of selectable content from the relevant content that was retrieved from the content datastore 202. The instruction to display the set of selectable content can be based, wholly or in part, on the search parameters that the multi-source content acquisition engine 214 provided to the multi-source content search engine 212. In this example, the instruction to display can transfer to a client device an icon associated with each item of selectable content. The multi-source content acquisition engine 214 can adjust the resolution of the transferred icons in order to accommodate the bandwidth of the communication channel between the multi-source content acquisition engine 214 and the client. For instance, if it is determined that the client can handle higher quality media content, the multi-source content acquisition engine 214 can provide higher resolution icons corresponding to the selectable content. Conversely, if the client can only handle lower quality media content, the multi-source content acquisition engine 214 can provide lower resolution icons corresponding to the selectable content. As a result, instructions from the multi-source content acquisition engine 214 can direct the editor window on the client to display a set of user-generated content generated by a plurality of sources. Advantageously, in some embodiments, the selectable content can be crowdsourced journal content.

In the example of FIG. 2, the multi-source content acquisition engine 214 can provide the instruction to launch the editor window indirectly to the client through the collaborative edit launch engine 216. One of ordinary skill in the art will appreciate that the multi-source content acquisition engine 214 can also provide the instruction to launch the editor window directly to the client.

In the example of FIG. 2, the collaborative edit launch engine 216, in operation, can receive the instruction to launch the editor window from the multi-source content acquisition engine 214. In this example, the collaborative edit launch engine 216 can translate the instruction from the multi-source content acquisition engine 214 into commands to launch multiple editing windows on multiple clients, of which a first client and second client are illustrated herein. For instance, the collaborative edit launch engine 216 can launch a first editor window on a first edit client and a second editor window on a second edit client based on the instruction to launch the editor window. More specifically, the collaborative edit launch engine 216 can identify a first client device and edit window parameters for an edit window to be displayed on the first client device. The collaborative edit launch engine 216 can also identify a second client device and edit window parameters for an edit window to be displayed on the second client device. In some embodiments, the collaborative edit launch engine 216 can provide network addresses and/or device identifiers of each of the first and second clients.

In the example of FIG. 2, the collaborative edit launch engine 216 can identify parameters of client host applications running on each of the first client and the second client. For instance, the collaborative edit launch engine 216 can identify the operating systems of the first and second clients, the type/version of the host applications on the first and second clients, and the device parameters (e.g., the screen resolution, processor speed, memory, and network speed) of the first and second clients. In some embodiments, the collaborative edit launch engine 216 can supply to the first and second clients respective edit windows with default parameters based on any of the OS or the host application parameters supplied. Further, the collaborative edit launch engine 216 can determine whether to recommend an upgraded operating system or host application to the first client or the second client. In various embodiments, the collaborative edit launch engine 216 can perform a "smart-bandwidth" determination on each of the first client and the second client and can determine the quality of content to be delivered to each of the first client and the second client for editing. Further, the collaborative edit launch engine 216 can also employ user account parameters when directing the first edit client and the second edit client to launch respective editing windows.

In the example of FIG. 2, the collaborative edit launch engine 216 can instruct one or more of the first editing window and the second editing window to display a set of selectable content from the relevant content that was retrieved from the content datastore 202. The content displayed on the first editing window may or may not be the same as the content displayed on the second editing window. The instruction to display the set of selectable content can be based, wholly or in part, on the search parameters that the multi-source content acquisition engine 214 provided to the multi-source content search engine 212. In this example, the instruction to display can transfer to one or more of the first client device and the second client device an icon associated with each item of selectable content. The collaborative edit launch engine 216 can adjust the resolution of the transferred icons in one or more of the first edit client and the second edit client in order to accommodate the bandwidth of the communication channel between the multi-source content acquisition engine 214 and these edit clients. Accordingly, the collaborative edit launch engine 216 can facilitate collaborative editing of content across multiple devices and clients. Advantageously, in some embodiments, the selectable content can be crowdsourced journal content.

In the example of FIG. 2, the multi-source content selection engine 218, in operation, can identify a set of selected content from the set of selectable content. In some embodiments, the multi-source content selection engine 218 can receive a selection of content from a host application on the one or more clients configured to display selectable content from the multi-source content acquisition engine 214 (or the collaborative edit launch engine 216). More specifically, user interface on the host applications can capture a user's identification of content that he or she desires to edit and/or publish. Based on the user's identified content, the multi-source content selection engine 218 can select a subset of the selectable content that was provided to the one or more clients. As used in this paper, the subset of identified content can be referred to as the "selected content." Once the set of selected content has been identified, the multi-source content selection engine 218 can provide the set of selected content to the integrated content arrangement engine 220.

In the example of FIG. 2, the multi-source content selection engine 218 can receive timeline information from the one or more clients. As used in this paper, timeline information comprises instructions on how the specific items of selected content are to be arranged in a sequence. In some embodiments, the timeline information can comprise an ordered list of the specific items of selected content. However, the timeline information can also comprise the relative lengths of items of selected content or other sequencing information. In the example of FIG. 2, the multi-source content selection engine 218 can transmit the timeline information to the integrated content arrangement engine 220.

In the example of FIG. 2, the integrated content arrangement engine 220, in operation, arranges the set of selected content into a multi-sourced journal content sequence. As used in this paper, a journal content sequence comprises items of journal content arranged in an sequence, an order, or a series. A multi-sourced journal content sequence comprises a journal content sequence made up of items of journal content taken from a plurality of sources, i.e., generated from a plurality of content generators. In this example, the integrated content arrangement engine 220 can receive a set of selected content from the multi-source content selection engine 218. Based on the timeline information from the multi-source content selection engine 218, the integrated content arrangement engine 220 can place items in the set of selected content (received from the multi-source content selection engine 218) into a multi-sourced journal content sequence. In some embodiments, the integrated content arrangement engine 220 can also add default transition effects, such as an automatic transition, between specific items of selected content to ensure attributes such as smooth transitions.

In the example of FIG. 2, the layer integration engine 222, in operation, applies an editing layer from the layer datastore 204 to a portion of the multi-sourced journal content sequence. As discussed in this paper, an "editing layer" is an element of content that can be superimposed onto another item of content. An editing layer can include one or more of an image, an item of audio, an effect, an item of video, animation, or an interactivity item that can accept user input. In some embodiments, the layer integration engine 222 can apply the editing layer to the multi-sourced journal content sequence based on an instruction to superimpose the editing layer. An instruction to superimpose an editing layer can include an identifier of specific editing layers and layer datastore 204 access parameters (such as layer datastore 204 usernames and passwords). In the illustrated example, the identifier of the editing layer can identify the editing layer by name, by the editing layer address in the layer datastore 204, or by the editing layer relationship to other layers in the layer datastore 204. The instruction to superimpose the editing layer can also include one or more API calls that obtain the editing layer from the layer datastore 204.

In the example of FIG. 2, the instruction to superimpose can include directing the placement of the editing layer over at least a portion of the multi-sourced journal content sequence. The instruction to superimpose can therefore include an instruction to assist in editing the multi-sourced journal content sequence.

In the example of FIG. 2, the instruction to superimpose the editing layer can also include performing one or more API calls to the editor window in the client. The instruction to superimpose the editing layer could also reference a portion of the timeline of the multi-sourced journal content sequence for which the editing layer is to be applied. For instance, the instruction could include superimposing textual credits for ten seconds to start the multi-sourced journal content sequence. The instruction to superimpose could also identify a visual portion of the multi-sourced journal content sequence for which the editing layer is to be applied. For example, the instruction to superimpose could include placing textual credits on the bottom left-hand quadrant of the multi-sourced journal content sequence.

In the example of FIG. 2, the editing layers could include video layers. Video layers are video clips that can be added to portions of the multi-sourced journal content sequence. For instance, a film editor may wish to add video to a corner of the multi-sourced journal content sequence so that the video appears integrated into the multi-sourced journal content sequence. The editing layers could include transition layers. Transition layers are video clips or images used to transition between scenes in the multi-sourced journal content sequence. For instance, a film editor may wish to recreate fading or wiping effects commonly seen in films. The editing layers could include sound layers such as audio effects or soundtracks for parts of the multi-sourced journal content sequence. The editing layers could further include graphical layers. Graphical layers are animated layers that film editors can use to create graphical effects for parts of the multi-sourced journal content sequence. Moreover, the editing layers could include user-specific media layers, which can correspond to video, audio, animated, and other content created or uploaded by a film editor or other users. FIGS. 9-12 show the video layers, transition layers, sound layers, graphical layers, and user-specific media layers.

In the example of FIG. 2, the instruction to superimpose the editing layer can associate the editing layer with a destination edit layer classification on the multi-sourced journal content sequence. Thus, based on an instruction, the layer integration engine 222 can add an editing layer to any of the destination edit layer classifications associated with the multi-sourced journal content sequence.

In the example of FIG. 2, the instruction to superimpose the editing layer can control effects relating to each editing layer. The instruction to superimpose the editing layer can control, for instance, whether a specific editing layer is to fade in or out. The instruction to superimpose the editing layer can also control the transparency and other attributes of a specific editing layer.

To apply the editing layer onto the existing layers of the multi-sourced journal content sequence, the layer integration engine 222 modifies the multi-sourced journal content sequence to include the material from the editing layer. For instance, if the editing layer was a video layer, the multi-sourced journal content sequence would include the video material from the editing layer. The layer integration engine 222 can similarly add audio, graphics, and other effects to the multi-sourced journal content sequence.

In the example of FIG. 2, the collaborative edit aggregation engine 224, in operation, can provide to the layer aggregation engine 222 a plurality of instructions. In some embodiments, the collaborative edit aggregation engine 224 can receive the instructions from a plurality of clients that are remote to the multi-source journal content integration server 200. More specifically, a first remote source can provide to the collaborative edit aggregation engine 224 a first instruction to apply a first editing layer from the layer datastore 204 to a portion of the multi-sourced journal content sequence. Further, a second remote source can provide to the collaborative edit aggregation engine 224 a second instruction to apply a second editing layer from the layer datastore 204 to the same or another portion of the multi-sourced journal content sequence. The collaborative edit aggregation engine 224 can provide the first and second instructions to the collaborative layer placement engine 226.

In the example of FIG. 2, the collaborative layer placement engine 226, in operation, can provide to the layer integration engine 222 a plurality of editing layers from a plurality of editing windows. In some embodiments, the collaborative layer placement engine 226 can provide to the layer integration engine 222 a first editing layer received from the first editor window and a second editing layer received from the second editor window. The collaborative layer placement engine 226 can receive the first and second editing layers from the collaborative edit aggregation engine 224. The collaborative layer placement engine 226 can instruct the layer integration engine 222 can add an editing layer to any of the destination edit layer classifications associated with the multi-sourced journal content sequence.

To illustrate the foregoing examples further, suppose a first remote client comprises a computer that is at a location remote from the multi-source journal content integration server 200, and a second remote client comprises a mobile phone with Internet capabilities that is at a location remote from both the multi-source journal content integration server 200 and the first remote client. Consistent with the example of FIG. 2, the first remote client (i.e., the computer) can provide an instruction to the collaborative edit aggregation engine 224 to apply an editing layer (e.g., placing a clip of video in a corner) for the first ten seconds of the multi-sourced journal content sequence. In this example, the second remote client (i.e., the mobile phone) can provide an instruction to the collaborative edit aggregation engine 224 to apply another layer (e.g., textual credits for an introduction) for the first ten seconds of the multi-sourced journal content sequence. In this example, the collaborative edit aggregation engine 224 can instruct the collaborative layer placement engine 226 to apply both the video from the first remote source and the text from the second remote source to the specified portion of the multi-sourced journal content sequence. The collaborative layer placement engine 226 can translate these commands (from different remote sources) into a format that the layer integration engine 222 can understand. In this example, the layer integration engine 222 can superimpose both the video and the text onto the specified portion of the multi-sourced journal content sequence. Accordingly, both the first remote client and the second remote client are able to collaboratively edit the multi-sourced journal content sequence even though they are remote to one another and remote to the multi-source journal content integration server 200.

In the example of FIG. 2, the multi-source content launch engine 228, in operation, can provide an instruction to display an integrated multi-sourced journal content sequence that includes the multi-sourced journal content sequence and the editing layer in the editor window. In some embodiments, the multi-source content launch engine 228 can interface with the editor window and provide an integrated multi-sourced journal content sequence which includes the original set of content and applied editing layers in the editor window. The instruction to display the integrated multi-sourced journal content sequence could comprise an instruction to begin streaming the integrated multi-sourced journal content sequence or otherwise playing the integrated multi-sourced journal content sequence in the host application. The multi-source content launch engine 228 can limit the viewing quality of the integrated multi-sourced journal content sequence until the multi-source content launch engine 228 has determined that the entity editing the integrated multi-sourced journal content sequence has creative rights to the multi-sourced journal content sequence and the editing layers applied thereon. In some embodiments, the multi-source content launch engine 228 can apply a watermark or other seal to render the integrated multi-sourced journal content sequence unpublishable until the multi-source content launch engine 228 has determined that the entity editing the integrated multi-sourced journal content sequence has creative rights to the multi-sourced journal content sequence and the editing layers applied thereon. Consequently, the multi-source content launch engine 228 can allow the one or more client applications to display the integrated multi-sourced journal content sequence while collaboratively editing from a plurality of remote sources.

In the example of FIG. 2, the multi-source channel publication engine 230, in operation, can create a multi-sourced channel comprising the integrated multi-sourced journal content sequence. In some embodiments, the multi-source channel publication engine 230 can interface with one or more network- or Internet-based streaming media accounts. For example, the multi-source channel publication engine 230 can login to an Internet-based streaming media account (such as Youtube) using a user name and password associated with the account. The multi-source channel publication engine 230 can further access one or more APIs of the streaming media account to publish the integrated multi-sourced journal content sequence to the network- or Internet-based streaming media account. In various embodiments, the multi-source channel publication engine 230 can translate the integrated multi-sourced journal content sequence into a digital television format and can publish the integrated multi-sourced journal content sequence using a digital broadcast mechanism. The multi-source channel publication engine 230 can limit the publication of the integrated multi-sourced journal content sequence by watermarking or lowering the resolution of the integrated multi-sourced journal content sequence until it is established that the publisher has the creative rights to the integrated multi-sourced journal content sequence.

FIG. 3 shows a diagram of an example of a multi-source journal content integration client 300. In the example of FIG. 3, the multi-source journal content integration client 300 includes a web browsing engine 302, a content editor display engine 304, a client-based content placement instruction engine 306, a client-based layer placement instruction engine 308, a superimposable layer display engine 310, a timeline display engine 312, and a multi-source content display engine 314. In this example, the multi-source journal content integration client 300 includes a local datastore 316 and a local storage buffer 318. The discussion below provides a description of the functionality of each of these engines and datastores.

In the example of FIG. 3, the web browsing engine 302, in operation allows a user of the multi-source journal content integration client 300 to access the Internet. In this example, the web browsing engine 302 is incorporated into an Internet browser. Existing Internet browsers include browsers manufactured by Microsoft®, Google®, Mozilla®, Apple®, and others. The web browsing engine 302 can be incorporated into personal computer, a mobile device, or other computing client.

In the example of FIG. 3, the web browsing engine 302 can run a host application. That is, the web browsing engine 302 can execute a browser plug-in in the Internet browser installed on the multi-source journal content integration client 300. The browser plug-in can provide an interface such as a graphical user interface (GUI) for a user to access the server-based content editing services. The browser plug-in can include a GUI to display content and layers on server datastores. For instance, the browser plug-in can have display capabilities like the capabilities provided by proprietary commercially available plug-ins like Adobe® Flash Player, QuickTime®, and Microsoft Silverlight®. The browser plug-in can also include an interface to execute server-initiated functionalities on server based engines.

In the example of FIG. 3, the content editor display engine 304, in operation, can launch an editor window for display on the multi-source journal content integration client 300. The editor window can be displayed in the host application on the multi-source journal content integration client 300. To launch and display the editor window, the content editor display engine 304 can call one or more APIs of the web browser plug-in, thereby allowing display of an editor window.

In the example of FIG. 3, the client-based content placement instruction engine 306, in operation, places a link to the content in the editor window. The client-based content placement engine 306 receives parameters, such as the server-address of the content to be placed, resolution, and playback speed. Based on these parameters, the client-based content placement instruction engine 306 places a link to the content (at the provided resolution, playback speed, etc.) in the editor window.

In the example of FIG. 3, the client-based layer placement instruction engine 308, in operation, places a link to an editing layer over the link to the content. Placing this link creates, on the server, a multi-source journal content sequence on the server.

In the example of FIG. 3, the superimposable layer display engine 310, in operation, displays links to editing layers as well as links to destination edit layer classifications in the edit window. Further, in this example, the timeline display engine 312, in operation, displays a link to the compilation timeline in the edit window. Additionally, the multi-source content display engine 314 can place a link to a multi-source journal content sequence in the edit window. As a result, the edit window can display a link to the multi-source journal content sequence, links to editing layers, and links to destination edit layer classifications. A user of the multi-source journal content integration client 300 has access to high-quality professional film editing of journalism pieces and documentaries without needing to install any editing software on the multi-source journal content integration client 300.

In the example of FIG. 3, the local datastore 316 can locally store any data on the multi-source journal content integration client 300. Also shown in FIG. 3 is the local storage buffer 318, which can buffer content to optimize editing and playback.

Figure 4:
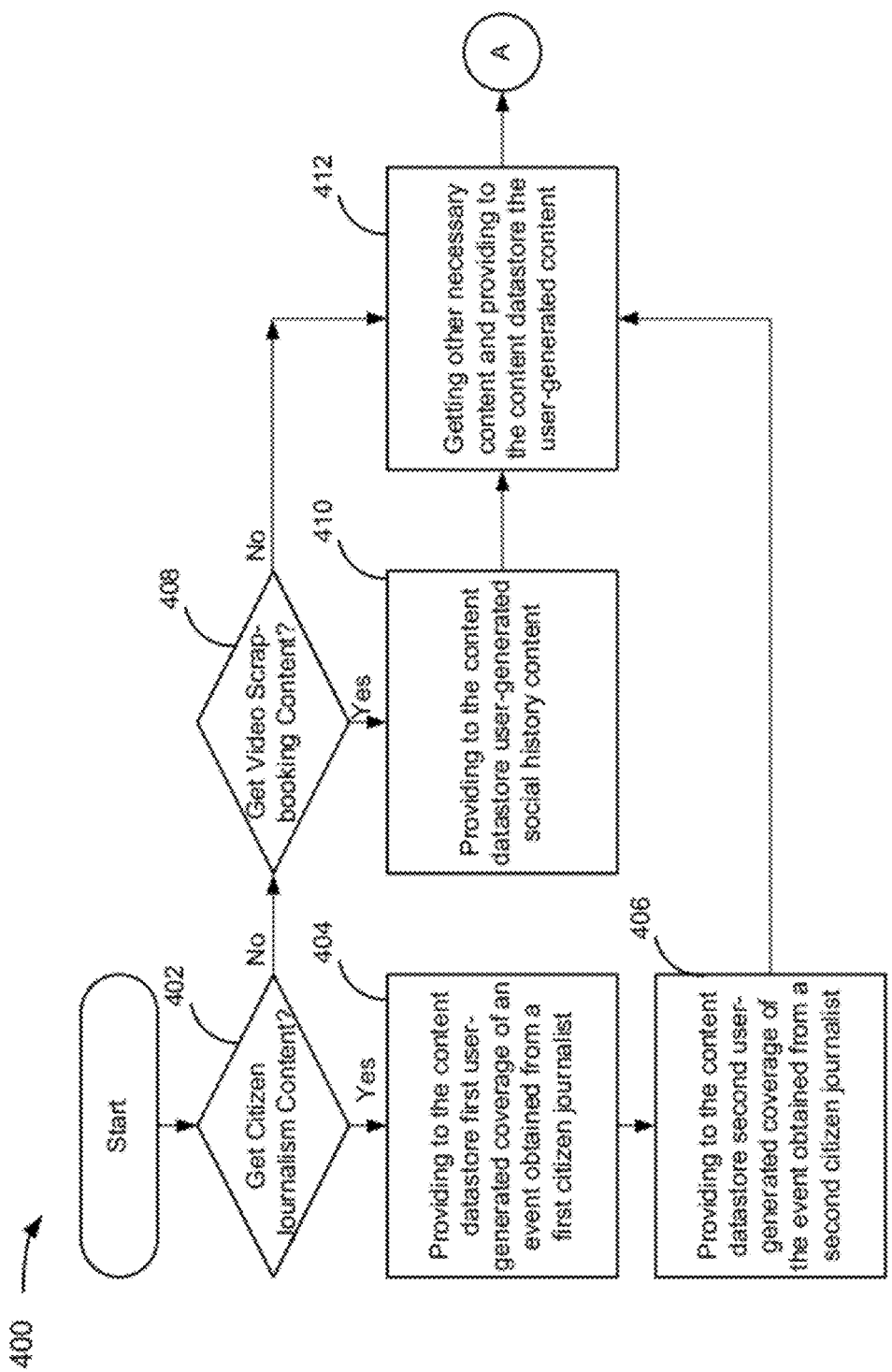
FIG. 4 shows a flowchart of an example of a method for providing journalism or video scrapbooking content.

FIG. 4 shows a flowchart 400 of an example of a method 400 for providing journalism or video scrapbooking content. In some implementations, the modules of the flowchart 400 and other flowcharts described in this paper are reordered to a permutation of the illustrated order of modules or reorganized for parallel execution. In the example of FIG. 4, the flowchart 400 can start at decision point 402, whether to get citizen journalism content. If the answer to the decision point 402 is yes, the flowchart 400 proceeds to module 404, providing to the content datastore first user-generated coverage of an event obtained from a first citizen journalist. The flowchart 400 can further proceed to module 406, providing to the content datastore second user-generated coverage of the event obtained from a second citizen journalist. In the example of FIG. 4, the flowchart can continue to step 412, which is further discussed below.

If the answer to the decision point 402 is no, the flowchart 400 can proceed to decision point 408, whether to get video scrapbooking content. If the answer to the decision point 408 is yes, the flowchart 400 can proceed to module 410, providing to the content datastore user-generated social history content. In this example, the flowchart 400 can proceed to module 412, getting other necessary content and providing to the content datastore the user-generated content. In the example of FIG. 4, the flowchart 400 then proceeds to transition point A.

Figure 5:
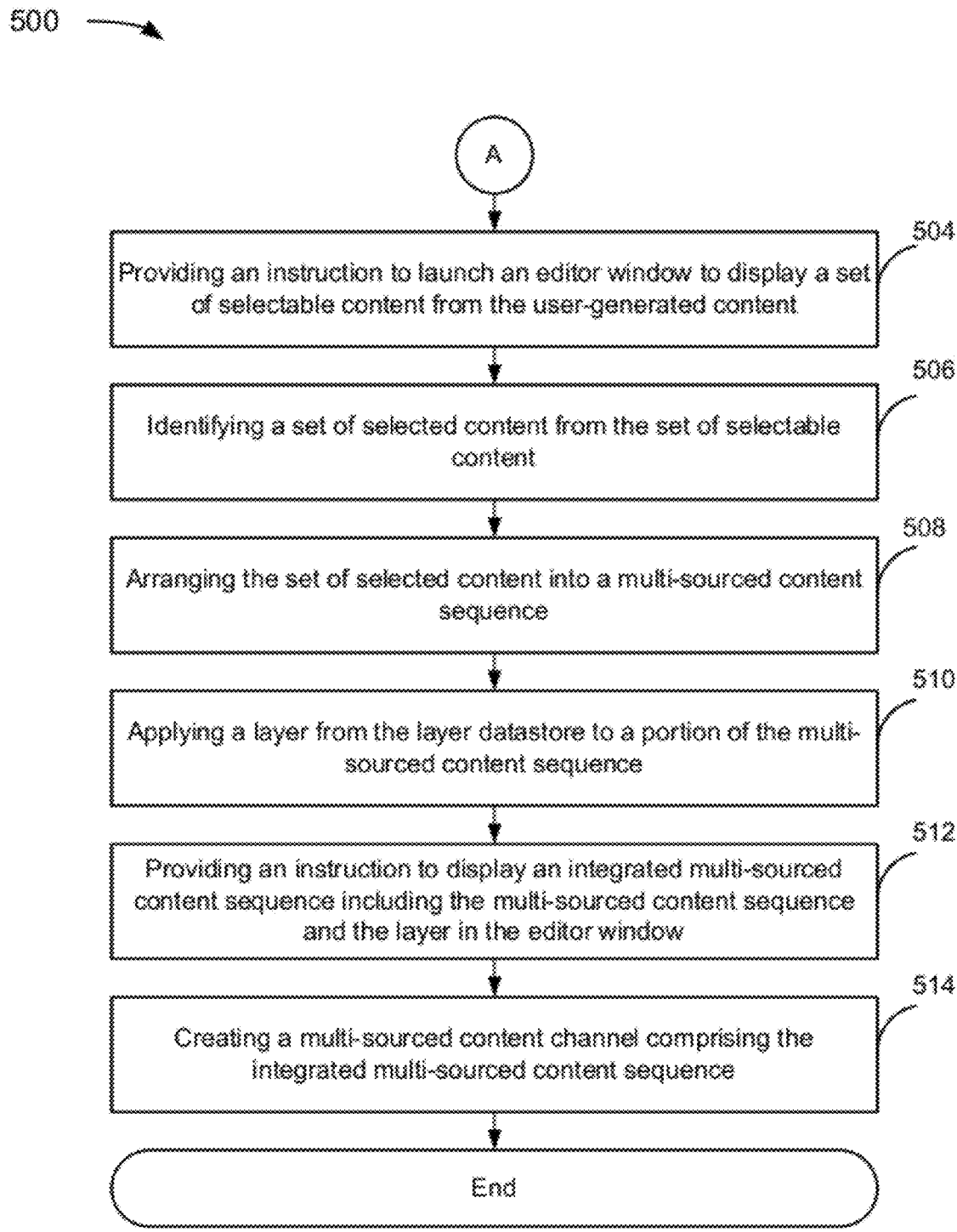
FIG. 5 shows a flowchart of an example of a method for integrating a multi-source journal content compilation.

FIG. 5 shows a flowchart of an example of a method 500 for integrating a multi-source journal content compilation. The flowchart 500 starts at transition point A and continues to module 504, providing an instruction to launch an editor window to display a set of selectable content from the user-generated content. In the example of FIG. 5, the flowchart 500 continues to module 506, identifying a set of selected content from the set of selectable content. The flowchart 500 can continue to module 508, arranging a set of selected content into a multi-sourced content sequence. The flowchart 500 can then continue to step 510, applying a layer from the layer datastore to a portion of the multi-sourced content sequence. The flowchart 500 can then continue to step 512, providing an instruction to display an integrated multi-sourced content sequence including the multi-sourced content sequence and the layer in the editor window. In the example of FIG. 5, the flowchart 500 can continue to step 514, creating a multi-sourced content channel comprising the integrated multi-sourced content sequence.

Figure 6:
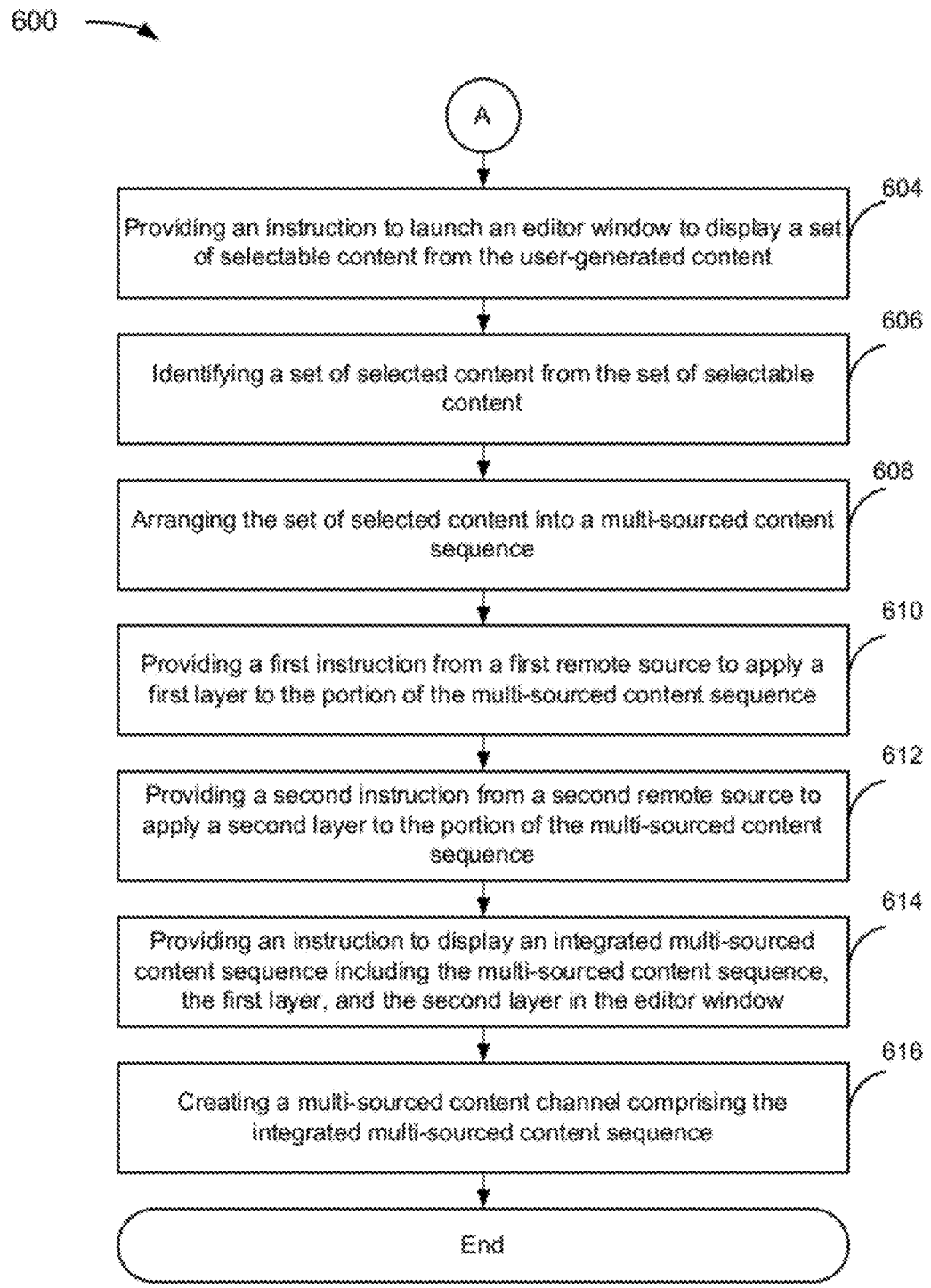
FIG. 6 shows a flowchart of an example of a method for integrating a multi-source journal content compilation using multiple remote editing sources.

FIG. 6 shows a flowchart of an example of a method 600 for integrating a multi-source journal content compilation using multiple remote editing sources. In the example of FIG. 6, the flowchart 600 starts at transition point A and continues to module 604, providing an instruction to launch an editor window to display a set of selectable content from the user-generated content. The flowchart 600 continues to module 606, identifying a set of selected content from the set of selectable content. The flowchart 600 can continue to module 608, arranging the set of selected content into a multi-sourced content sequence. The flowchart 600 can then continue to module 610, providing a first instruction from a first remote source to apply a first layer to the portion of the multi-sourced content sequence. The flowchart 600 can then continue to module 612, providing a second instruction from a second remote source to apply a second layer to the portion of the multi-sourced content sequence. The flowchart 600 can continue to module 614, providing an instruction to display an integrated multi-sourced content sequence including the multi-sourced content sequence, the first layer, and the second layer, in the editor window.

Figure 7:
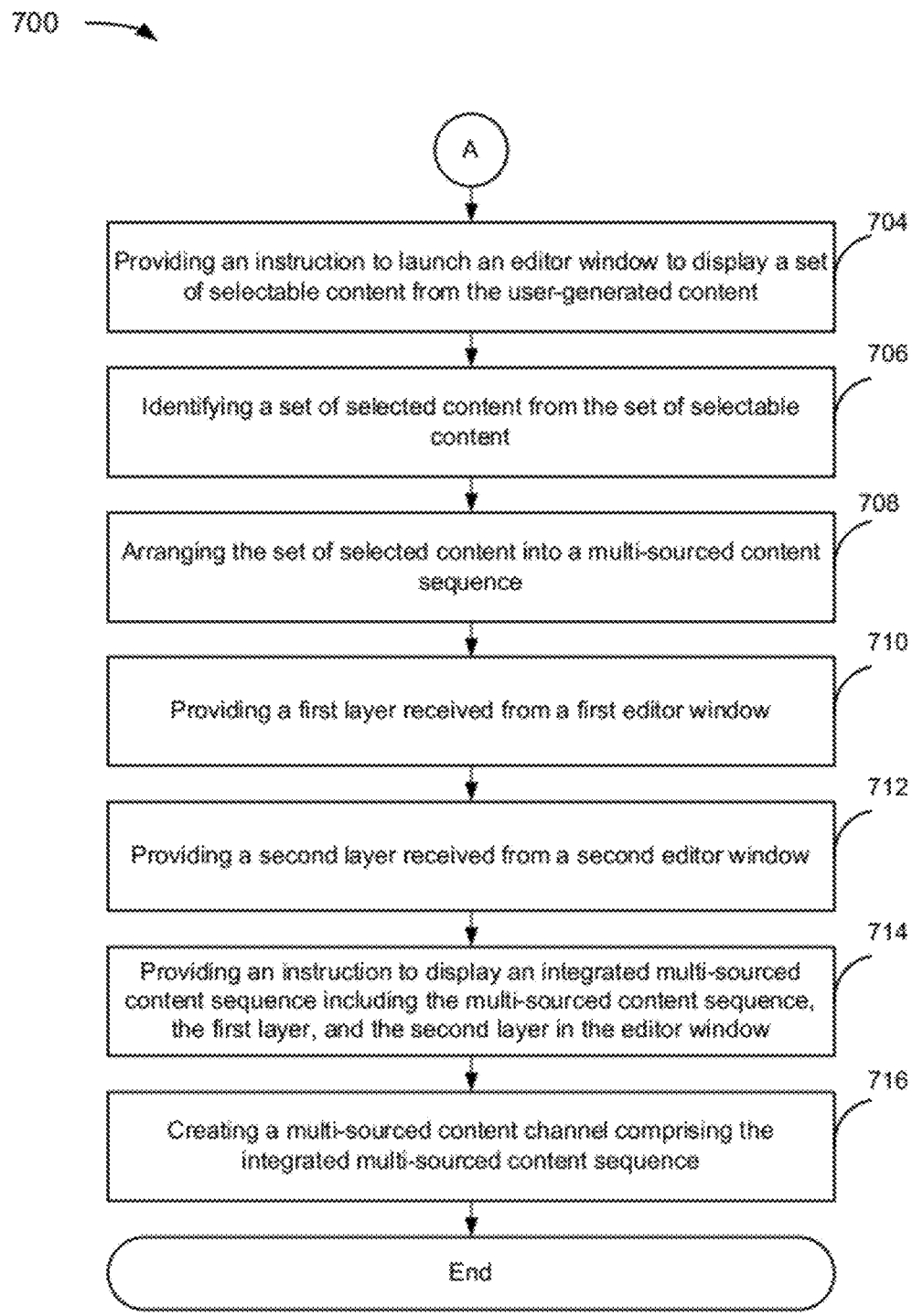
FIG. 7 shows a flowchart of an example of a method for integrating a multi-source journal content compilation using multiple editing windows.

FIG. 7 shows a flowchart of an example of a method 700 for integrating a multi-source journal content compilation using multiple editing windows. In the example of FIG. 7, the flowchart 700 starts at transition point A and continues to module 704, providing an instruction to launch an editor window to display a set of selectable content from the user-generated content. The flowchart 700 can continue to module 706, identifying a set of selected content from the set of selectable content. The flowchart 700 can then continue to module 708, arranging the set of selected content into a multi-sourced content sequence. The flowchart 700 can then continue to module 710, providing a first layer received from a first editor window. The flowchart 700 can then continue to module 712, providing a second layer received from a second editor window. The flowchart 700 can continue to module 714, providing an instruction to display an integrated multi-sourced content sequence including the multi-sourced content sequence, the first layer, and the second layer in the editor window. The flowchart 700 can continue to module 716, creating a multi-sourced content channel comprising the integrated multi-sourced content sequence.

Figure 8:
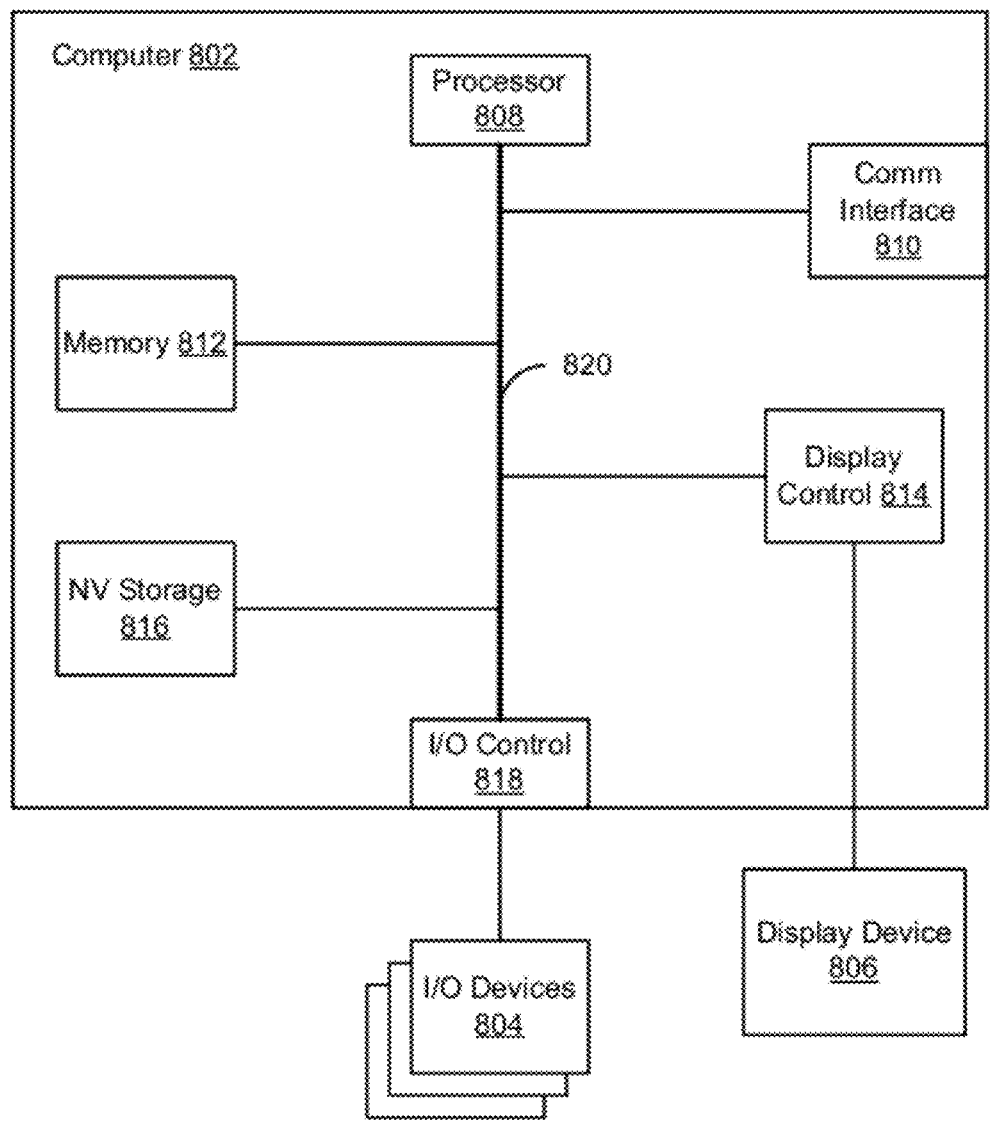
FIG. 8 shows an example of a computer.

FIG. 8 shows an example of a system on which techniques described in this paper can be implemented. The computer system 800 can be a conventional computer system that can be used as a client computer system, such as a wireless client or a workstation, or a server computer system. The computer system 800 includes a computer 802, I/O devices 804, and a display device 806. The computer 802 includes a processor 808, a communications interface 810, memory 812, display controller 814, non-volatile storage 816, and I/O controller 818. The computer 802 may be coupled to or include the I/O devices 804 and display device 806.

The computer 802 interfaces to external systems through the communications interface 810, which may include a modem or network interface. It will be appreciated that the communications interface 810 can be considered to be part of the computer system 800 or a part of the computer 802. The communications interface 810 can be an analog modem, ISDN modem, cable modem, token ring interface, satellite transmission interface (e.g. "direct PC"), or other interfaces for coupling a computer system to other computer systems.

The processor 808 may be, for example, a conventional microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the memory 812, also to the non-volatile storage 816, to the display controller 814, and to the I/O controller 818.

The I/O devices 804 can include a keyboard, disk drives, printers, a scanner, and other input and output devices, including a mouse or other pointing device. The display controller 814 may control in the conventional manner a display on the display device 806, which can be, for example, a cathode ray tube (CRT) or liquid crystal display (LCD). The display controller 814 and the I/O controller 818 can be implemented with conventional well known technology.

The non-volatile storage 816 is often a magnetic hard disk, an optical disk, or another form of storage for large amounts of data. Some of this data is often written, by a direct memory access process, into memory 812 during execution of software in the computer 802. One of skill in the art will immediately recognize that the terms "machine-readable medium" or "computer-readable medium" includes any type of storage device that is accessible by the processor 808 and also encompasses a carrier wave that encodes a data signal.

The computer system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

Figure 9:
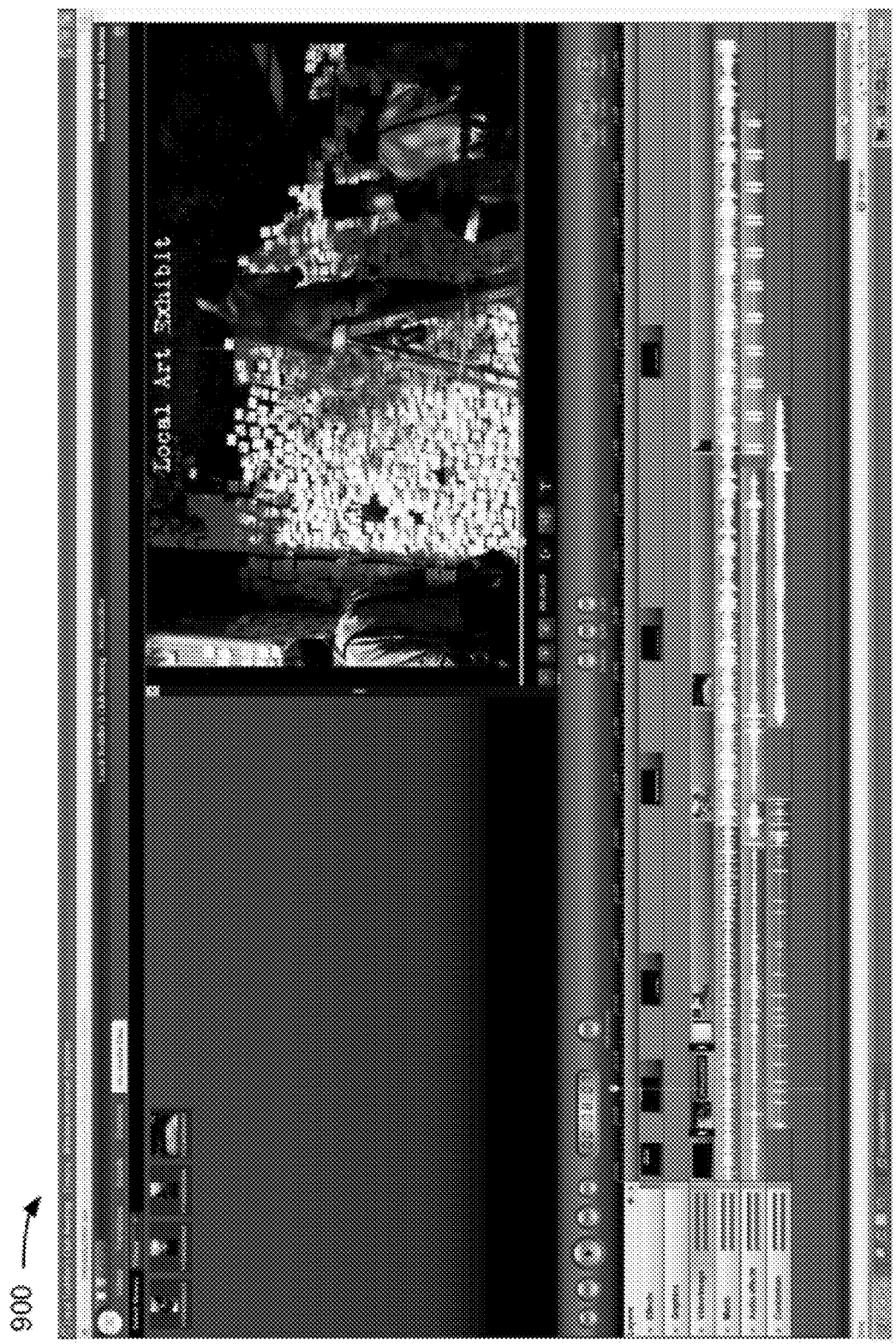
FIG. 9 shows an example of a multi-sourced journal content sequence client web browser screenshot.

FIG. 9 shows an example of a multi-sourced journal content sequence client web browser screenshot 900. In the example of FIG. 9, the screenshot 900 shows an editor window incorporated into an internet browser, here the Internet Explorer web browser from Microsoft®. The editor window displays content, namely, a video for editing in the upper right hand corner. The editor window displays a series of editing effects. In this example, editing effects include "Videos," "Transitions, "Sounds," Graphics," and "My media files." In this example, a user has selected the "My media files" set of editing layers and sees a set of content files, i.e., the video files "VIDEO0015," "VIDEO0062,"

"VIDEO0056," and "VIDEO0057." In this example, each of the content files "VIDEO0015," "VIDEO0062," "VIDEO0056," and "VIDEO0057" can be sourced from different citizen journalists and can relate to a single event. For instance, the content files here can relate to a toddler's club meeting occurring locally. In the example of FIG. 9, the content files "VIDEO0015," "VIDEO0062," "VIDEO0056," and "VIDEO0057" have been arranged at various points along the timeline, as shown in the "Video/image" editing layer. In the example of FIG. 9, the screenshot 900 shows that a user is adding layers to or otherwise editing the content file IMAG0597 showing a set of post-it notes on a store window to commemorate a memorial of an infamous computer pioneer; it is seen as a local art exhibit and a matter of public interest. The screenshot 900 further shows the addition of text at the point 00:08:07 in the timeline, producing a scene title for integrated journal content.

Figure 10:
FIG. 10 shows a multi-sourced journal content sequence client web browser screenshot.

FIG. 10 shows a multi-sourced journal content sequence client web browser screenshot 1000. In the example of FIG. 10, the screenshot 1000 shows that a user is editing or otherwise adding layers to the content file IMAG0599, which shows a local toddler's club meeting.

Figure 11:
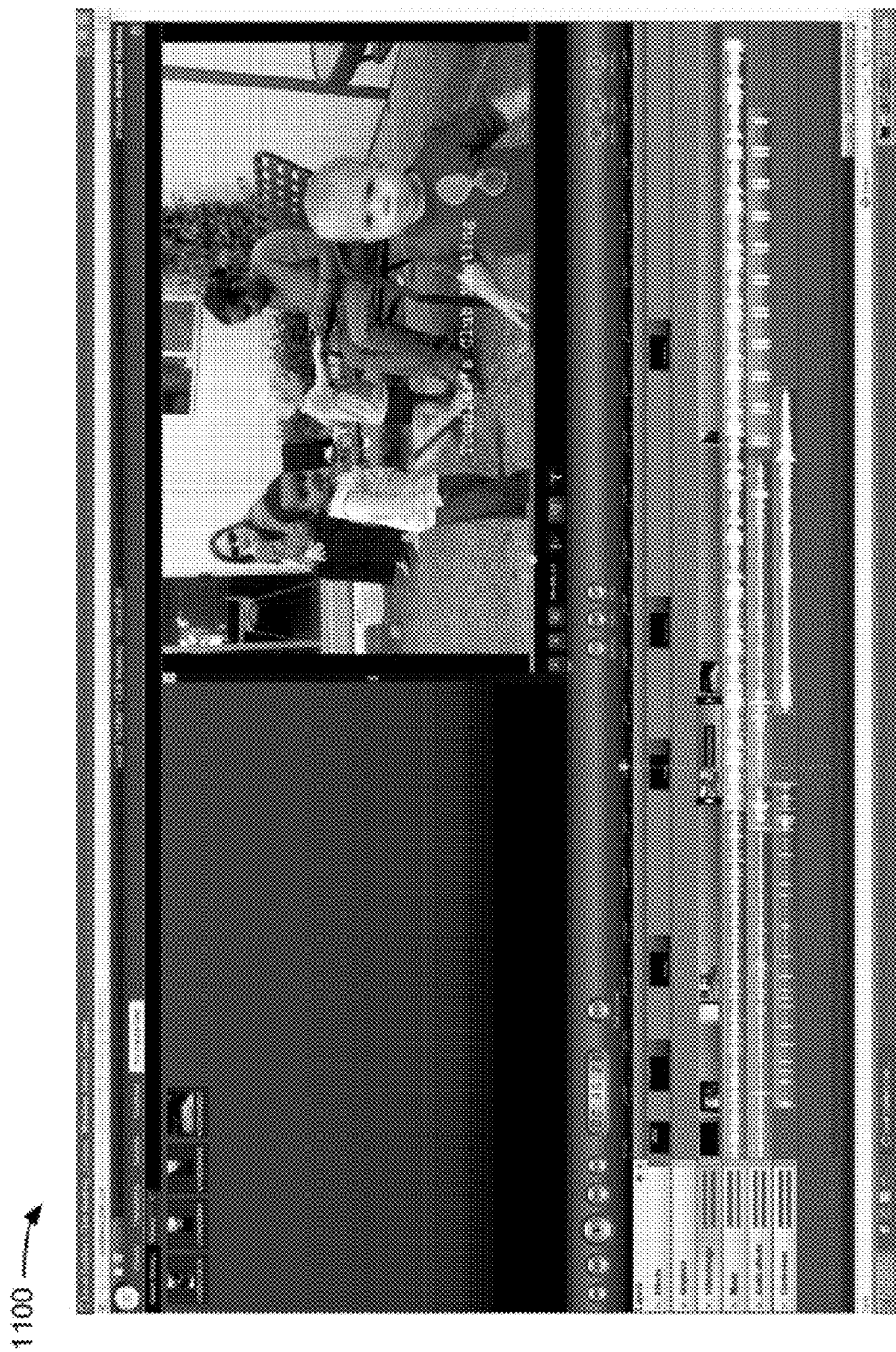
FIG. 11 shows a multi-sourced journal content sequence client web browser screenshot.

FIG. 11 shows a multi-sourced journal content sequence client web browser screenshot 1100. In the example of FIG. 11, the screenshot 1110 shows that a user is editing or otherwise adding layers to the content file IMAG0601, which shows a local toddler's club meeting.

Figure 12:
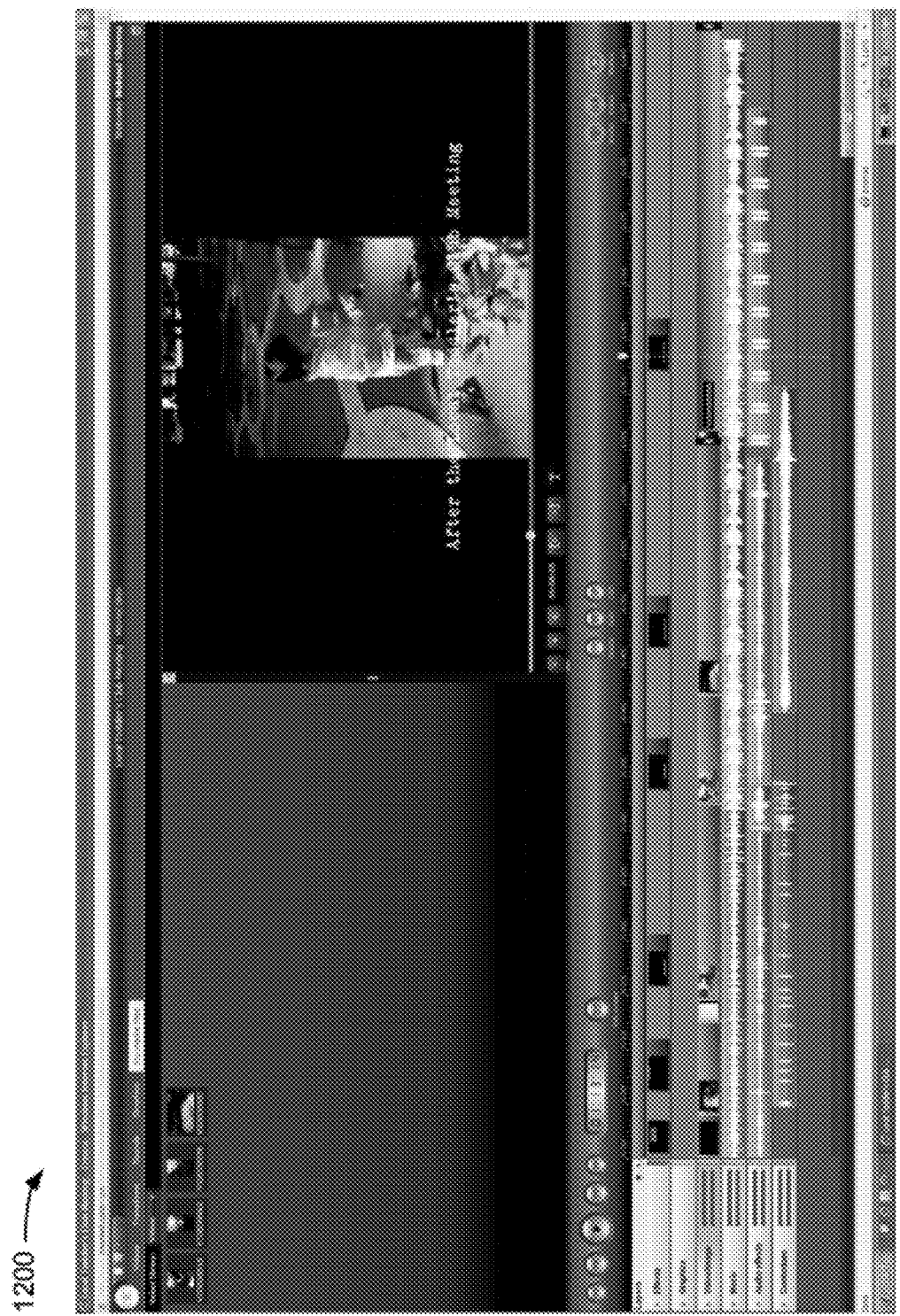
FIG. 12 shows a multi-sourced journal content sequence client web browser screenshot.

FIG. 12 shows a multi-sourced journal content sequence client web browser screenshot 1200. In the example of FIG. 12, the screenshot 1200 shows that a user is editing or otherwise adding layers to the content file VIDEO0056, which shows a something occurring after the local toddler's club meeting.

As disclosed in this paper, embodiments allow editors to create professional productions based on a wide variety of amateur and professional content gathered from numerous sources. Embodiments free editors from using only footage generated at large studios and monopolized by a few content generators. Embodiments also let individual content generators contribute their creative audio, images, and video without unrestricted release of their ideas and rights into the public domain. By facilitating the exchange of amateur and professional content from a wide variety of sources and giving editors professional, easily accessible editing tools, embodiments let editors create vivid content that is robust and not limited to one of a few sets of centralized narratives.

Although the foregoing embodiments have been described in some detail for purposes of clarity of understanding, the invention is not necessarily limited to the details provided.

We claim:
1. A system, comprising:
a processor;
a content datastore;
a layer datastore distributed across a plurality of servers to store a plurality of editing layers;
a multi-source content acquisition engine coupled to the content datastore;
a multi-source content selection engine coupled to the multi-source content acquisition engine;
an integrated content arrangement engine coupled to the multi-source content selection engine;
a collaborative edit aggregation engine coupled to the layer datastore;
a collaborative layer placement engine coupled to the collaborative edit aggregation engine;
a layer integration engine coupled to the collaborative layer placement engine, the collaborative edit aggregation engine, and the integrated content arrangement engine;
a multi-source content launch engine coupled to the layer integration engine;
a collaborative edit launch engine coupled to the multi-source content acquisition engine;
wherein, in operation:
the multi-source content acquisition engine provides a first instruction to launch an editor window to display a set of selectable content generated from user-generated content, the user-generated content being generated by a plurality of remote sources and stored in the content datastore, each of the plurality of remote sources comprising a digital device configured to provide the user-generated content to the system over a network connection;
the multi-source content selection engine identifies a set of selected content from the set of selectable content;
the integrated content arrangement engine arranges the set of selected content into a multi-sourced journal content sequence;
the collaborative edit aggregation engine provides an editing layer from the layer datastore to the collaborative layer placement engine according to instructions received from a first remote source of the plurality of remote sources;
the collaborative layer placement engine:
provides the editing layer, a portion of the multi-sourced journal content sequence associated with an item of content included as part of the set of selected content and used to display the editing layer, and at least a portion of a sequence of the multi-sourced journal content sequence in which to display the editing layer, to the layer integration engine according to the instructions received from the first remote source; and
provides to the layer integration engine a plurality of instructions comprising: a second instruction from a second remote source of the plurality of remote sources to apply a first layer from the layer datastore to the portion of the multi-sourced journal content sequence, and a third instruction from a third remote source of the plurality of remote sources to apply a second layer from the layer datastore to the portion of the multi-sourced journal content sequence;
the layer integration engine applies the editing layer to the portion of the multi-sourced journal content sequence during the at least a portion of the sequence of the multi-sourced journal content sequence by associating the editing layer with an edit layer classification associated with the multi-sourced journal content sequence, to allow the second remote source and the third remote source to collaboratively edit the multi-sourced journal content sequence;
the multi-source content launch engine provides, according to the application of the editing layer to the portion of the multi-sourced journal content sequence, a fourth instruction to display an integrated multi-sourced journal content sequence including the multi-sourced journal content sequence and the editing layer displayed superimposed on the portion of the multi-sourced journal content sequence in the editor window during the at least the portion of the sequence of the multi-sourced journal content sequence;

the collaborative edit launch engine:
- receives the first instruction to launch the editor window from the multi-source content acquisition engine;
- launches a first editor window on a first remote edit client associated with the third remote source, the first editor window displaying the multi-sourced journal content sequence during the at least the portion of the sequence of the multi-sourced journal content sequence, the launching the first editor window being based on the first instruction to launch the editor window;
- launches a second editor window on a second remote edit client associated with the fourth remote source, the second editor window displaying the multi-sourced journal content sequence during the at least the portion of the sequence of the multi-sourced journal content sequence, the launching the second editor window being based on the first instruction to launch the editor window;
- the first instruction to launch the editor window from the multi-source content acquisition engine facilitating the collaborative edit of the multi-sourced journal content sequence.

2. The system of claim 1, further comprising a multi-source channel publication engine coupled to the layer integration engine, wherein, in operation, the multi-source channel publication engine creates a multi-source content channel comprising the integrated multi-sourced journal content sequence.

3. The system of claim 1, further comprising a journalism sourcing engine coupled to the multi-source content acquisition engine and the content datastore;
wherein, in operation, the journalism sourcing engine provides to the multi-source content acquisition engine:
- first user-generated coverage of an event obtained from a first citizen journalist;
- second user-generated coverage of the event obtained from a second citizen journalist.

4. The system of claim 1, further comprising a content marketplace engine coupled to the content datastore, wherein, in operation, the content marketplace engine facilitates user-based exchange of user-generated journal content.

5. The system of claim 1, further comprising a content scrapbooking engine coupled to the multi-source content acquisition engine and the content datastore, wherein, in operation, the content scrapbooking engine provides to the content datastore user-generated social history content.

6. A method, comprising:
using a multi-source content acquisition engine to provide a first instruction to launch an editor window to display a set of selectable content generated from user-generated content, the user-generated content being generated by a plurality of remote sources and stored in a content datastore;
configuring a multi-source content selection engine to identify a set of selected content from the set of selectable content;
using an integrated content arrangement engine to arrange the set of selected content into a multi-sourced journal content sequence;
receiving instructions from a first remote source of the plurality of remote sources;

providing an editing layer from a layer datastore distributed across a plurality of servers to provide an unconstrained number of editing layers, a portion of the multi-sourced journal content sequence associated with an item of content included as part of the set of selected content and used to display the editing layer, and at least a portion of a sequence of the multi-sourced journal content sequence in which to display the editing layer, to a layer integration engine according to the instructions received from the first remote source;

using a collaborative edit aggregation engine to provide to the layer integration engine a plurality of instructions comprising:
- a second instruction from a second remote source of the plurality of remote sources to apply a first layer from the layer datastore to the portion of the multi-sourced journal content sequence;
- a third instruction from a third remote source of the plurality of remote sources to apply a second layer from the layer datastore to the portion of the multi-sourced journal content sequence;

using the layer integration engine to apply the editing layer from the layer datastore to the portion of the multi-sourced journal content sequence during the at least a portion of the sequence of the multi-sourced journal content sequence by associating the editing layer with an edit layer classification associated with the multi-sourced journal content sequence, to allow the second remote source and the third remote source to collaboratively edit the multi-sourced journal content sequence;

providing, according to the application of the editing layer to the portion of the multi-sourced journal content sequence, a fourth instruction to display, using a multi-source content launch engine, an integrated multi-sourced journal content sequence including the multi-sourced journal content sequence and the editing layer displayed superimposed on the portion of the multi source multi-sourced journal content sequence in the editor window during the at least the portion of the sequence of the multi source multi-sourced journal content sequence;

using a collaborative edit launch engine to:
- receive the first instruction to launch the editor window from the multi-source content acquisition engine;
- launch a first editor window on a first remote edit client associated with the third remote source, the first editor window displaying the multi-sourced journal content sequence during the at least the portion of the sequence of the multi-sourced journal content sequence, the launching the first editor window being based on the first instruction to launch the editor window;
- launch a second editor window on a second remote edit client associated with the fourth remote source, the second editor window displaying the multi-sourced journal content sequence during the at least the portion of the sequence of the multi-sourced journal content sequence, the launching the second editor window being based on the first instruction to launch the editor window;
- the first instruction to launch the editor window from the multi-source content acquisition engine facilitating the collaborative edit of the multi-sourced journal content sequence.

7. The method of claim 6, further comprising using a multi-source channel publication engine to create a multi-sourced content channel comprising the integrated multi-sourced journal content sequence.

8. The method of claim 6, further comprising:
using a multi-source content search engine to receive a request from the multi-source content selection engine to search the content datastore for subject-specific content;
using the multi-source content search engine to provide the subject-specific content to the multi-source content selection engine.

9. The method of claim 6, further comprising using a collaborative layer placement engine to provide to the layer integration engine a first layer received from a first editor window and a second layer received from a second editor window.

10. The method of claim 6, further comprising using a journalism sourcing engine to provide to the multi-source content acquisition engine:
first user-generated coverage of an event obtained from a first citizen journalist;
second user-generated coverage of the event obtained from a second citizen journalist.

11. The method of claim 6, further comprising facilitating user-based exchange of user-generated journal content.

12. The method of claim 6, further comprising using a content scrapbooking engine to provide to the multi-source content acquisition engine user-generated social history content.

13. A system comprising:
one or more physical processors programmed with one or more computer program instructions which, when executed, cause the one or more physical processors to:
provide a first instruction to launch an editor window to display a set of selectable content generated from user-generated content, the user-generated content being generated by a plurality of remote sources and stored in a content datastore;
identify a set of selected content from the set of selectable content;
arrange the set of selected content into a multi-sourced journal content sequence;
receive instructions from a first remote source of the plurality of remote sources;
provide an editing layer from a layer datastore distributed across a plurality of servers to provide an unconstrained number of editing layers, a portion of the multi-sourced journal content sequence associated with an item of content included as part of the set of selected content and used to display the editing layer, and at least a portion of a sequence of the multi-sourced journal content sequence in which to display the editing layer, to a layer integration engine according to the instructions received from the first remote source;
provide to the layer integration engine a plurality of instructions comprising:

a second instruction from a second remote source of the plurality of remote sources to apply a first layer from the layer datastore to the portion of the multi-sourced journal content sequence;
a third instruction from a third remote source of the plurality of remote sources to apply a second layer from the layer datastore to the portion of the multi-sourced journal content sequence;
apply the editing layer from the layer datastore to the portion of the multi-sourced journal content sequence during the at least a portion of the sequence of the multi-sourced journal content sequence by associating the editing layer with an edit layer classification associated with the multi-sourced journal content sequence, to allow the second remote source and the third remote source to collaboratively edit the multi-sourced journal content sequence;
provide, according to the application of the editing layer to the portion of the multi-sourced journal content sequence, a fourth instruction to display, using a multi-source content launch engine, an integrated multi-sourced journal content sequence including the multi-sourced journal content sequence and the editing layer displayed superimposed on the portion of the multi-sourced journal content sequence in the editor window during the at least the portion of the sequence of the multi-sourced journal content sequence;
receive, from a collaborative edit launch engine, the first instruction to launch the editor window from the multi-source content acquisition engine;
launch, from the collaborative edit launch engine, a first editor window on a first remote edit client associated with the third remote source, the first editor window displaying the multi-sourced journal content sequence during the at least the portion of the sequence of the multi-sourced journal content sequence, the launching the first editor window being based on the first instruction to launch the editor window;
launch, from the collaborative edit launch engine, a second editor window on a second remote edit client associated with the fourth remote source, the second editor window displaying the multi-sourced journal content sequence during the at least the portion of the sequence of the multi-sourced journal content sequence, the launching the second editor window being based on the first instruction to launch the editor window;
the first instruction to launch the editor window from the multi-source content acquisition engine facilitating the collaborative edit of the multi-sourced journal content sequence.

* * * * *

UNITED STATES PATENT AND TRADEMARK OFFICE
CERTIFICATE OF CORRECTION

| | | |
|---|---|---|
| PATENT NO. | : 9,460,752 B2 | Page 1 of 1 |
| APPLICATION NO. | : 13/434709 | |
| DATED | : October 4, 2016 | |
| INVENTOR(S) | : Jostein Svendsen and Bjørn Rustberggaard | |

It is certified that error appears in the above-identified patent and that said Letters Patent is hereby corrected as shown below:

In the Claims

In Column 28, Lines 38 - 39, Claim 6:
-- the multi source multi-sourced journal content sequence --

Should be:
-- the multi-sourced journal content sequence --

In Column 28, Lines 41 - 42, Claim 6:
-- the multi source multi-sourced journal content sequence; --

Should be:
-- the multi-sourced journal content sequence; --

Signed and Sealed this
Twenty-first Day of February, 2017

Michelle K. Lee
*Director of the United States Patent and Trademark Office*